US010237357B2

(12) United States Patent
Kaechi

(10) Patent No.: US 10,237,357 B2
(45) Date of Patent: Mar. 19, 2019

(54) COMMUNICATION APPARATUS, CONTROL METHOD THEREFOR, AND RECORDING MEDIUM

(71) Applicant: CANON KABUSHIKI KAISHA, Tokyo (JP)

(72) Inventor: Shuya Kaechi, Hashimoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/714,941

(22) Filed: Sep. 25, 2017

(65) Prior Publication Data

US 2018/0091606 A1 Mar. 29, 2018

(30) Foreign Application Priority Data

Sep. 29, 2016 (JP) ................. 2016-191590

(51) Int. Cl.
| | |
|---|---|
| *H04W 4/80* | (2018.01) |
| *H04W 88/04* | (2009.01) |
| *H04L 29/08* | (2006.01) |
| *G06F 3/12* | (2006.01) |
| *G06F 11/07* | (2006.01) |
| *H04N 1/00* | (2006.01) |
| *H04W 8/00* | (2009.01) |

(52) U.S. Cl.
CPC ............ *H04L 67/16* (2013.01); *G06F 3/1292* (2013.01); *G06F 3/1294* (2013.01); *G06F 11/07* (2013.01); *H04W 4/80* (2018.02); *H04N 1/00015* (2013.01); *H04N 1/00079* (2013.01); *H04N 1/00286* (2013.01); *H04N 1/00307* (2013.01); *H04W 8/005* (2013.01)

(58) Field of Classification Search
CPC ..................................................... H04W 4/008
See application file for complete search history.

(56) References Cited

U.S. PATENT DOCUMENTS

| | | | | |
|---|---|---|---|---|
| 9,640,061 | B1* | 5/2017 | Klimanis | H04W 76/14 |
| 2012/0052802 | A1* | 3/2012 | Kasslin | H04W 48/12 |
| | | | | 455/41.2 |
| 2012/0258665 | A1* | 10/2012 | Sip | H04W 84/18 |
| | | | | 455/41.2 |
| 2014/0155050 | A1* | 6/2014 | Choi | H04W 4/008 |
| | | | | 455/418 |
| 2014/0169599 | A1* | 6/2014 | Solum | H04R 25/554 |
| | | | | 381/315 |

(Continued)

FOREIGN PATENT DOCUMENTS

JP 2010-165106 A 7/2010

*Primary Examiner* — Cindy Trandai
(74) *Attorney, Agent, or Firm* — Canon U.S.A., Inc. IP Division

(57) ABSTRACT

A first advertise signal from a first external apparatus is received. A connection request is transmitted to the first external apparatus in response to the received first advertise signal. A connection is established with the first external apparatus, and a predetermined function is executed by using the established connection. In a case where the first advertise signal is received and an error relating to the predetermined function occurs before a connection with the first external apparatus is established, a connection request is transmitted to the first external apparatus to establish a connection with the first external apparatus and transmits a notification indicating that the error occurred.

14 Claims, 23 Drawing Sheets

(56) References Cited

U.S. PATENT DOCUMENTS

| | | | |
|---|---|---|---|
| 2014/0355582 A1* | 12/2014 | Kamath | H04W 84/20 |
| | | | 370/338 |
| 2016/0224279 A1* | 8/2016 | Kim | H04L 67/10 |
| 2016/0227351 A1* | 8/2016 | Gu | H04L 61/6022 |
| 2016/0241728 A1* | 8/2016 | Naruse | H04N 1/00347 |
| 2016/0323355 A1* | 11/2016 | Watanabe | H04L 67/025 |
| 2016/0371961 A1* | 12/2016 | Narang | H04W 8/005 |
| 2017/0038923 A1* | 2/2017 | Tsuzuki | G06F 3/0482 |
| 2017/0134609 A1* | 5/2017 | Park | H04N 1/32776 |
| 2017/0161786 A1* | 6/2017 | Terazaki | G06Q 30/0267 |
| 2017/0286028 A1* | 10/2017 | Yang | G06F 3/1203 |
| 2017/0290071 A1* | 10/2017 | Ito | H04W 76/10 |
| 2017/0303080 A1* | 10/2017 | Stitt | H04W 4/02 |
| 2017/0311223 A1* | 10/2017 | Yan | H04W 8/005 |
| 2017/0353979 A1* | 12/2017 | Lee | H04W 76/10 |
| 2018/0015755 A1* | 1/2018 | Yamada | G06F 3/1236 |
| 2018/0032291 A1* | 2/2018 | Goto | G06F 3/1221 |

* cited by examiner

FIG. 4

| COMBINATION | EXISTENCE OF PAPER | EXISTENCE OF INK | SIZE MATCHING | PRINT SERVICE AVAILABILITY | NOTIFICATION INFORMATION |
|---|---|---|---|---|---|
| (A) | YES | YES | OK | YES (OK) | Service 1 (PRINT_OK) UUID 1 |
| (B) | YES | NO | — | NO | Service 2 (NO_INK) UUID 2 |
| (C) | NO | YES | — | NO | Service 3 (NO_PAPER) UUID 3 |
| (D) | NO | NO | — | NO | Service 4 (NO_INK_NO_PAPER) UUID 4 |
| (E) | YES | YES | NOT MATCHED | NO | Service 5 (UNMATCH_SIZE) UUID 5 |

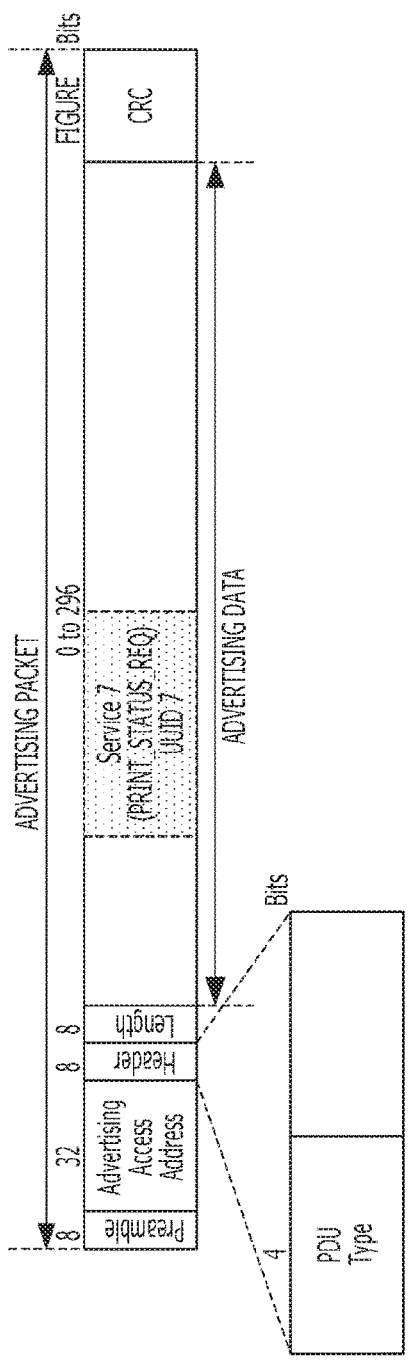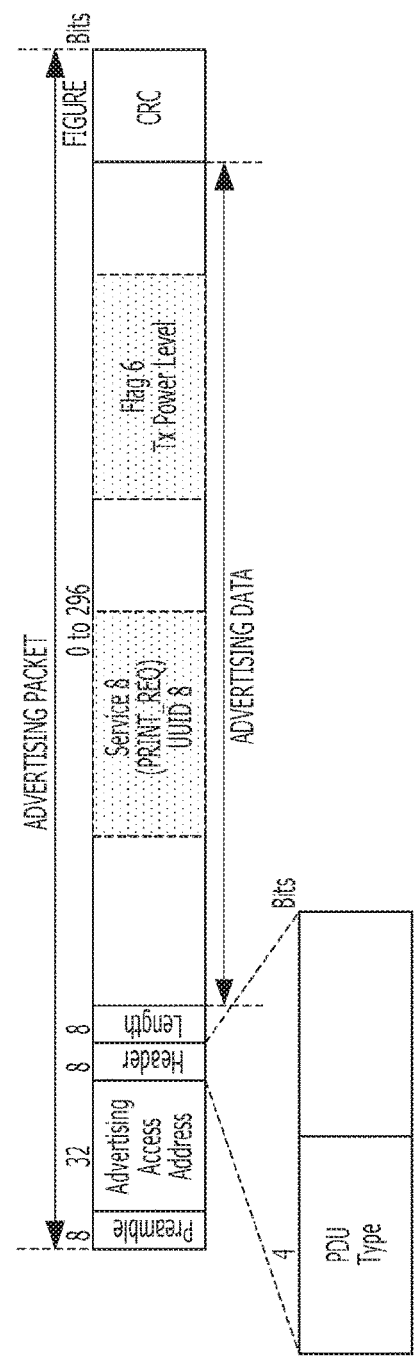
FIG. 6A
FIG. 6B

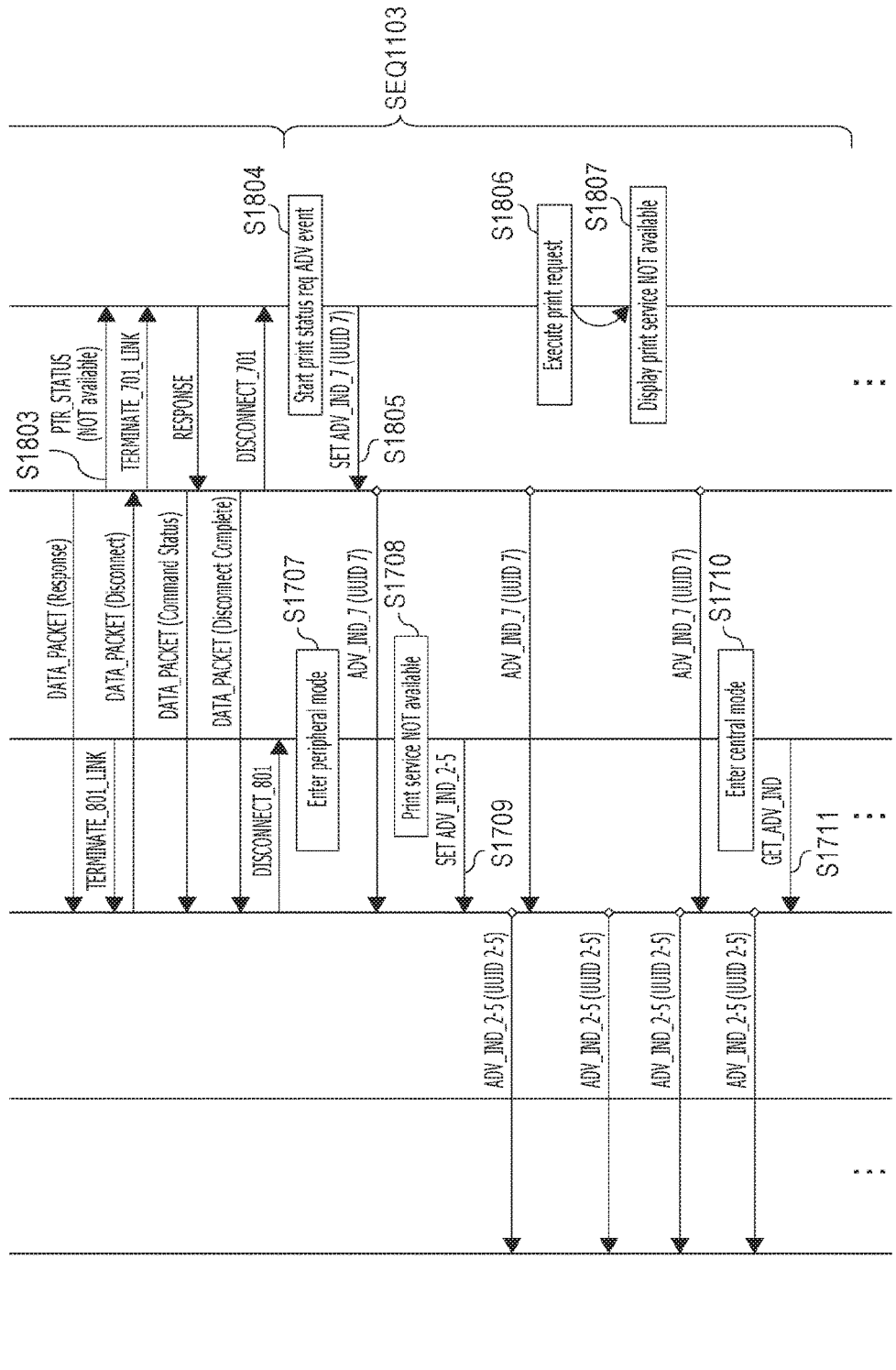

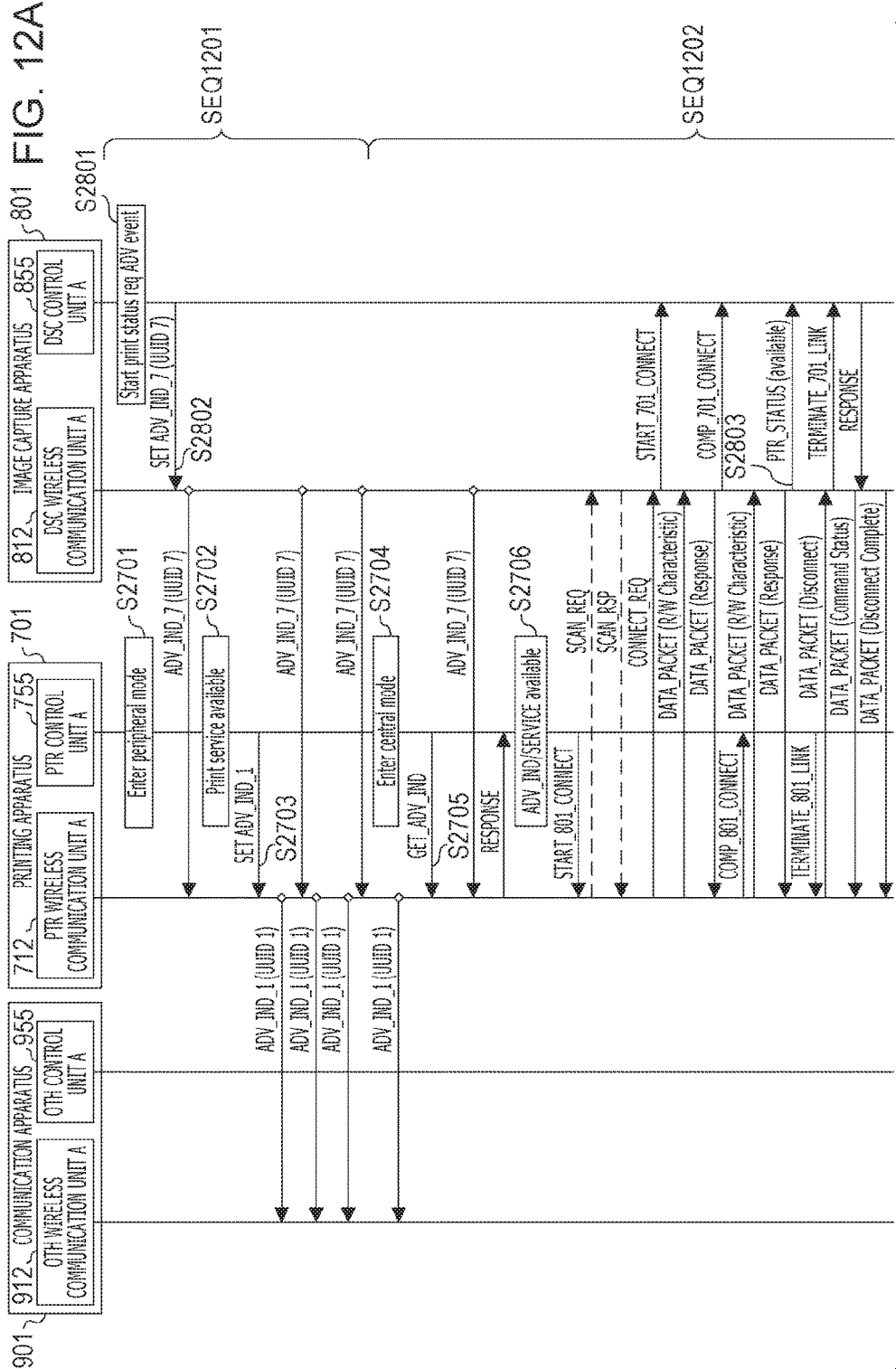

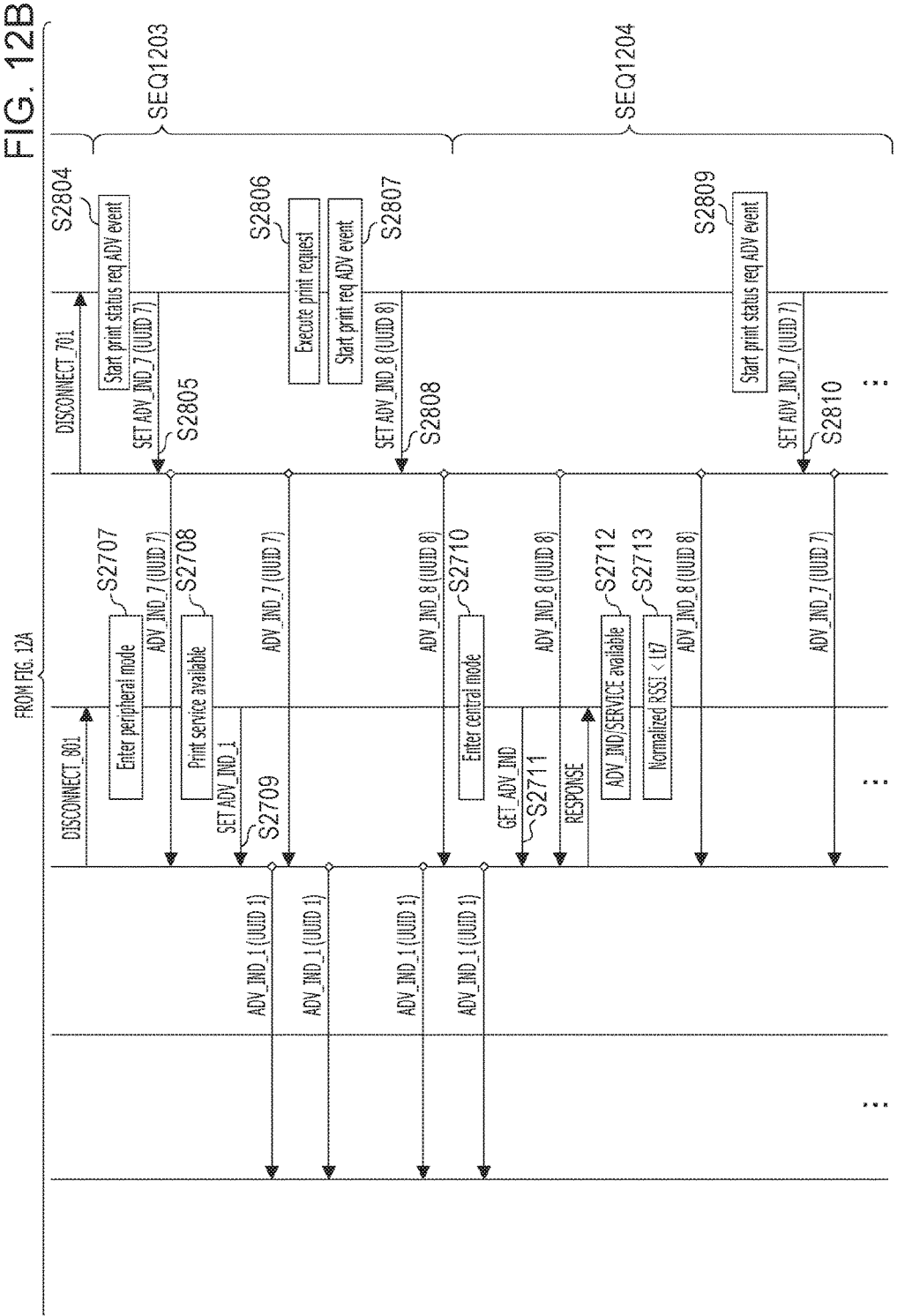

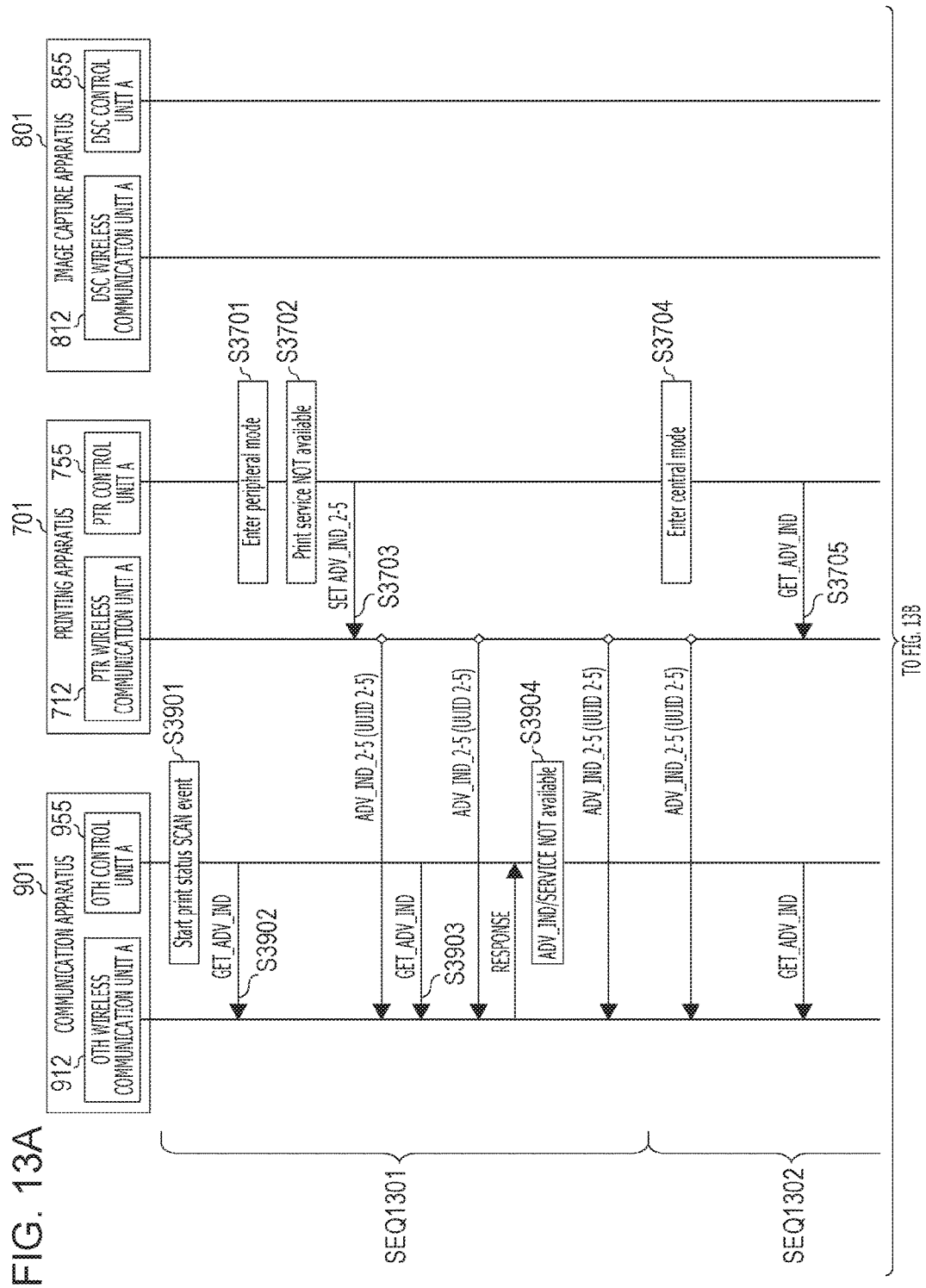

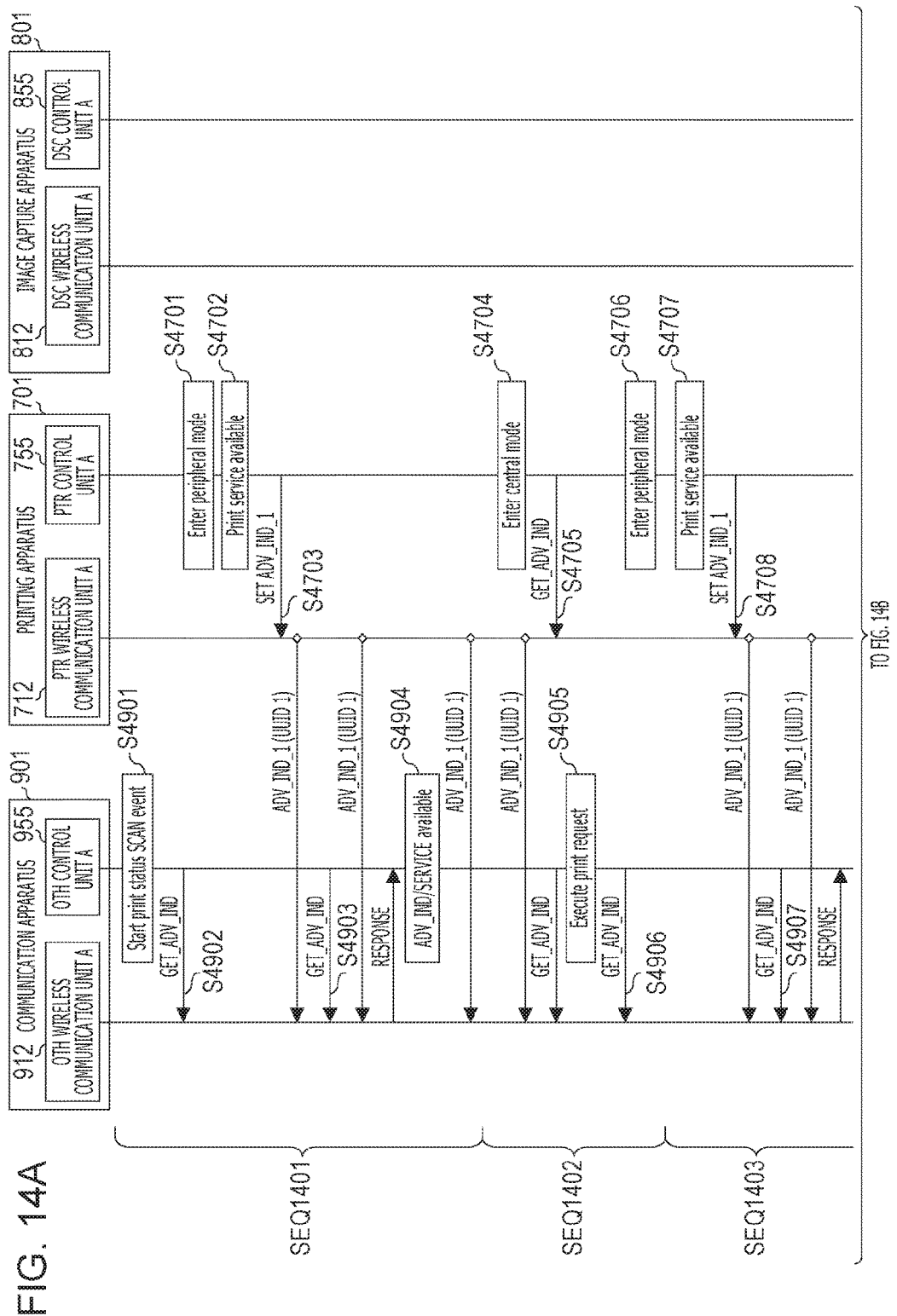

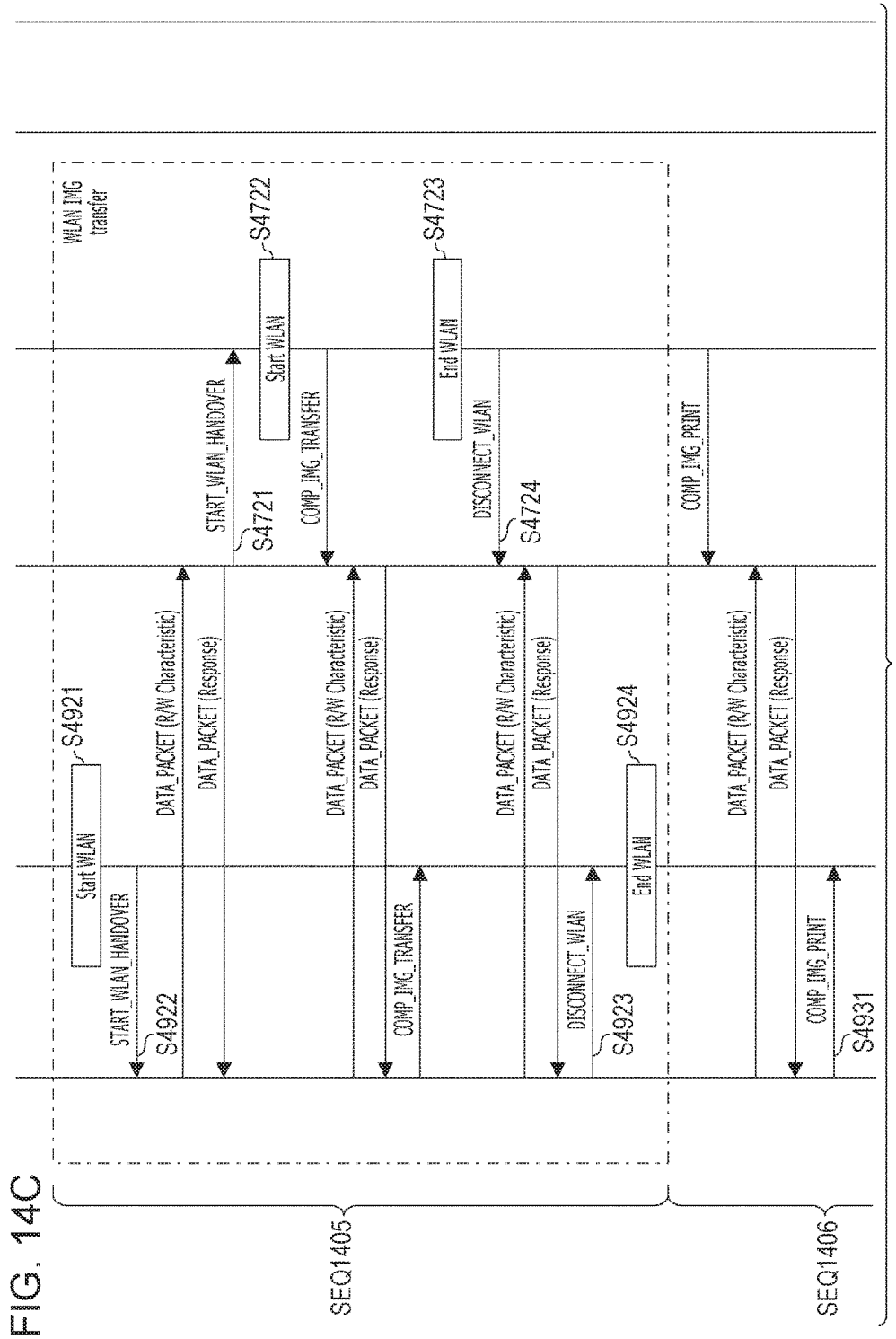

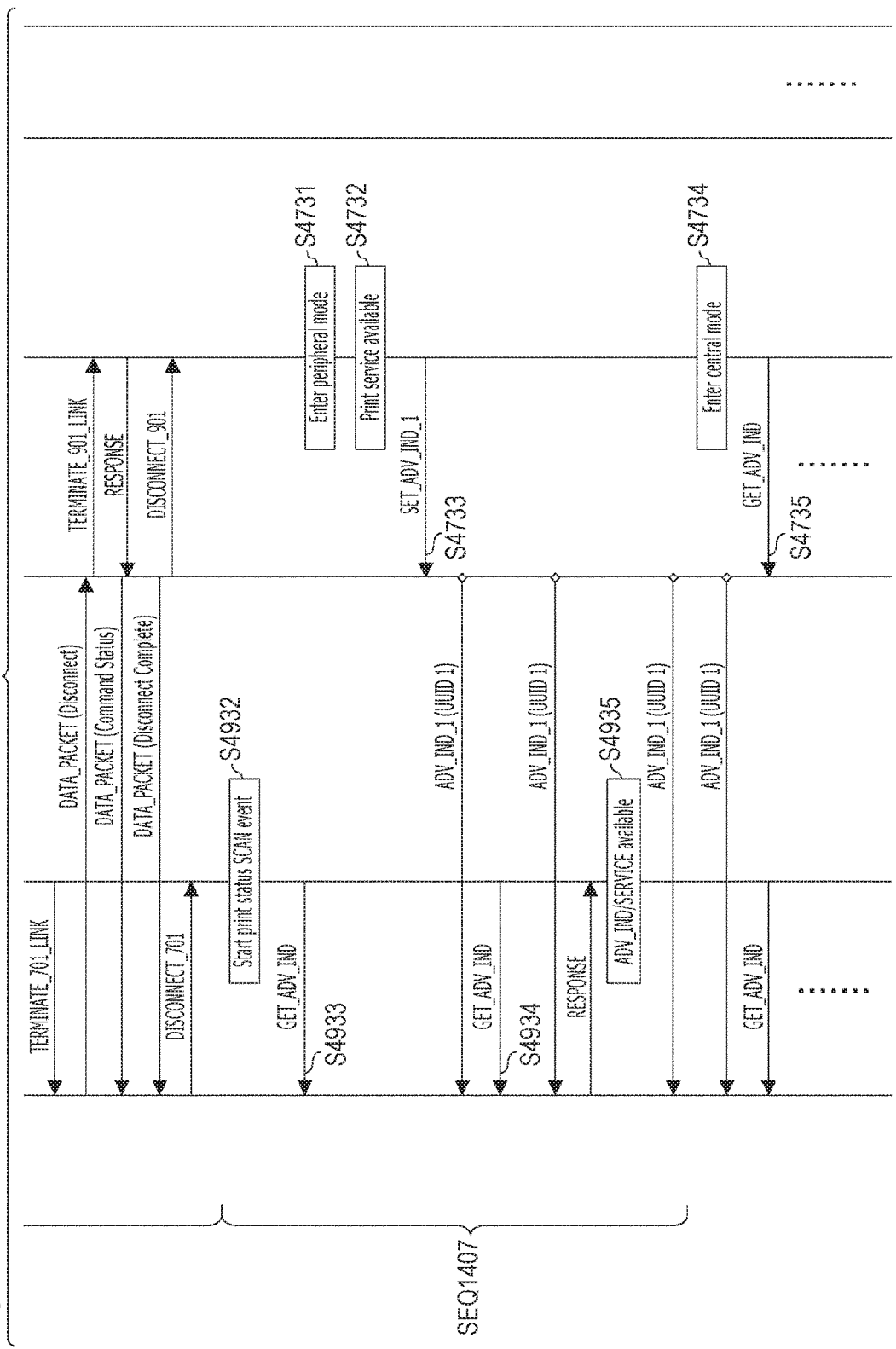

COMMUNICATION APPARATUS, CONTROL METHOD THEREFOR, AND RECORDING MEDIUM

BACKGROUND

Field

The present disclosure relates to a technology for data communication with an external apparatus.

Description of the Related Art

Wireless communication for data communication between a mobile terminal and an information apparatus such as a printing apparatus is spreading widely. Various apparatuses including not only mobile terminals and printing apparatuses but also image capture apparatuses such as a digital camera and accessory devices therefor are generally equipped with a wireless communication function.

According to a wireless communication standard in recent years, wireless communication functionality that consumes less power is provided such as Bluetooth® Low Energy. With Bluetooth® Low Energy, a peripheral apparatus having a peripheral role transmits an advertising packet. A central apparatus being a central role and receiving the advertising packet requests a connection, establishes the connection and transmits and receives data after the connection is established.

In such wireless communication, one apparatus may notify an error to the other apparatus for higher convenience. For example, Japanese Patent Laid-Open No. 2010-165106 discloses a technology which, in a case where a digital camera transmits a print request to a multifunction peripheral and an error then occurs in the multifunction peripheral, continuously notifies the occurrence of the error until the digital camera and the multifunction peripheral come close to each other by predetermined distance.

SUMMARY

A communication apparatus according to an aspect of the present disclosure includes at least one processor and a communication interface, wherein the at least one processor functions as a receiving unit configured to receive a first advertise signal from a first external apparatus via the communication interface, a transmitting unit configured to transmit a connection request to the first external apparatus via the communication interface in response to receipt of the first advertise signal, and an executing unit configured to establish a connection based on the connection request with the first external apparatus and execute a predetermined function using the established connection. In a case where the first advertise signal is received and an error relating to the predetermined function occurs before a connection with the first external apparatus is established, the transmitting unit transmits a connection request to the first external apparatus via the communication interface to establish a connection with the first external apparatus and transmits a notification indicating that the error occurred.

Further features will become apparent from the following description of exemplary embodiments with reference to the attached drawings.

BRIEF DESCRIPTION OF THE DRAWINGS

FIG. 4 illustrates combination examples of print service availability statuses of the printing apparatus and notification information according to the first embodiment.

FIGS. 6A and 6B illustrate data examples of an advertising packet in the image capture apparatus according to the first embodiment.

FIG. 11B is a sequence diagram illustrating a procedure for notification of a print service availability status between the printing apparatus and the image capture apparatus according to the first embodiment.

FIG. 12A is a sequence diagram illustrating a procedure for notification of a print service availability status and execution of a print service between the printing apparatus and the image capture apparatus according to the first embodiment.

FIG. 12B is a sequence diagram illustrating the procedure for notification of a print service availability status and execution of a print service between the printing apparatus and the image capture apparatus according to the first embodiment.

FIG. 13A is a sequence diagram illustrating a procedure for notification of a print service availability status between the printing apparatus and the communication apparatus according to the first embodiment.

FIG. 14A is a sequence diagram illustrating a procedure for notification of a print service availability status and execution of a print service between the printing apparatus and the communication apparatus according to the first embodiment.

FIG. 14C is a sequence diagram illustrating the procedure for notification of a print service availability status and execution of a print service between the printing apparatus and the communication apparatus according to the first embodiment.

FIG. 14D is a sequence diagram illustrating the procedure for notification of a print service availability status and execution of a print service between the printing apparatus and the communication apparatus according to the first embodiment.

DESCRIPTION OF THE EMBODIMENTS

Figure 1:
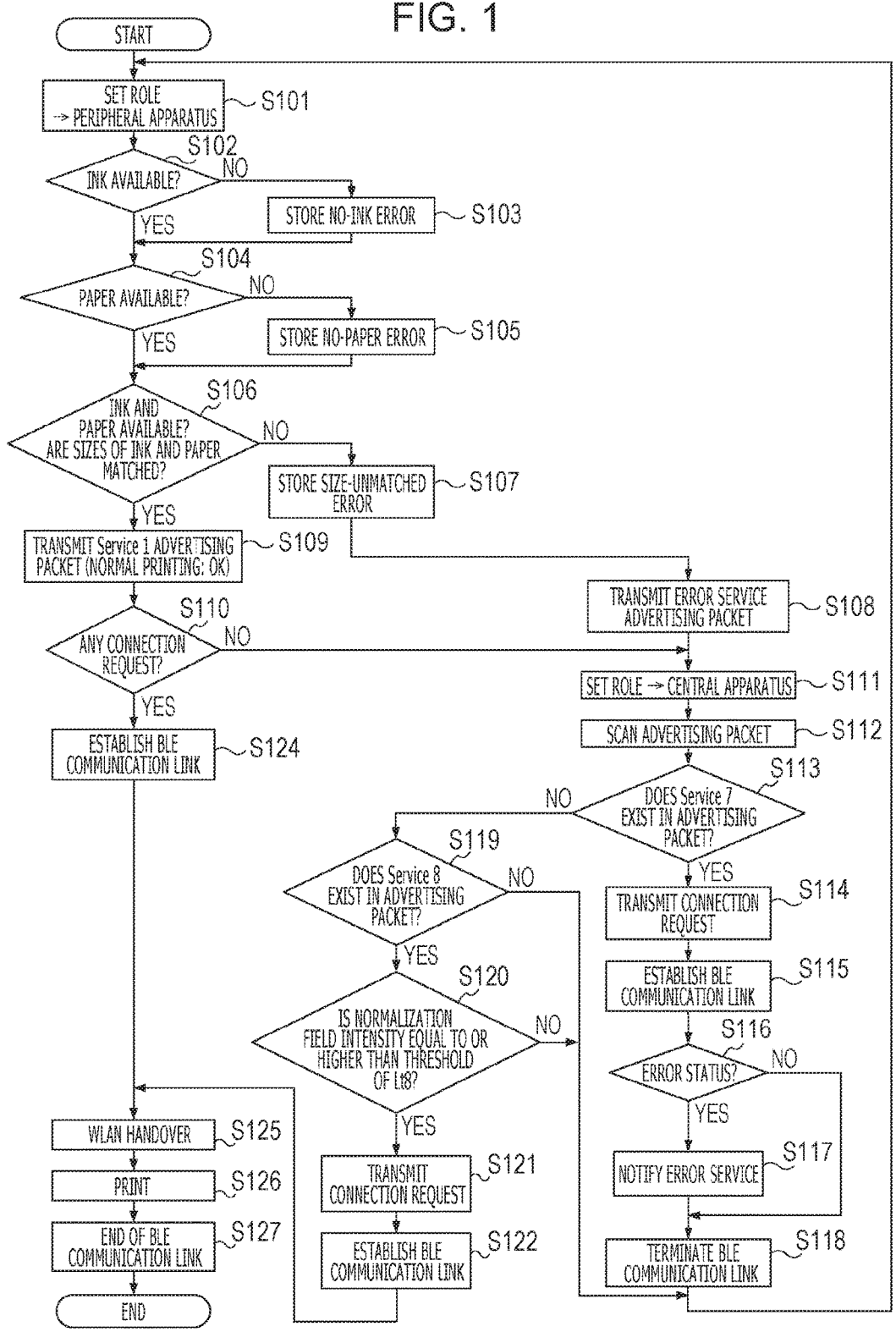
FIG. 1 is a flowchart illustrating notification of print service availability status of a printing apparatus and a printing procedure according to a first embodiment.

Embodiments will be described below with reference to the attached drawings. It is intended that the technological scope of the present disclosure is defined by the claims and is not limited by the following individual embodiments. All of combinations of features according to the embodiments are not required in the present disclosure.

The dimensions and shapes of constituent elements and the relative layout thereof according to the following embodiments can vary in accordance with the configuration and condition of an apparatus to which the present disclosure is applied, and the present disclosure is not limited to the embodiments.

First Embodiment

System Outline

An outline of a first embodiment will be described with reference to FIG. 10. According to this embodiment, a printing apparatus 701 and other apparatuses (such as an image capture apparatus 801 and a communication apparatus 901) are communicated.

First, roles of the printing apparatus 701, the image capture apparatus 801, and the communication apparatus 901 in Bluetooth® Low Energy communication will be described. With Bluetooth® Low Energy, a peripheral apparatus having a peripheral role transmits an advertising packet. A central apparatus having a central role and receiving the advertising packet transmits a connection request in response thereto and establishes a wireless communication link (hereinafter, which will be expressed as "establish a connection"). After the connection is established, data are exchanged.

The printing apparatus 701 according to this embodiment has a PTR wireless communication unit B 722 and can communicate with another apparatus. Particularly, the printing apparatus 701 can operate as a Bluetooth peripheral apparatus or central apparatus. The printing apparatus 701 has functions to receive and print content data such as document data and image data from the image capture apparatus 801 and the communication apparatus 901. The reception of image data is not to be performed necessarily with Bluetooth® Low Energy. This point will be described below.

The image capture apparatus 801 according to this embodiment can operate as a peripheral apparatus corresponding to the printing apparatus 701 and can transmit an advertise signal (packet) corresponding to the printing apparatus 701 but cannot operate as a central apparatus and cannot transmit a connection request. Thus, in order to establish a Bluetooth® Low Energy connection between the image capture apparatus 801 and the printing apparatus 701, the printing apparatus 701 is to operate as a central apparatus, and the image capture apparatus 801 is to operate as a peripheral apparatus.

A communication apparatus 901 according to this embodiment may be a cellular phone such as a smart phone. The communication apparatus 901 according to this embodiment operates as a central apparatus corresponding to the printing apparatus 701 and can transmit a connection request but cannot operate as a peripheral apparatus and cannot transmit an advertising packet corresponding to the printing apparatus 701. Thus, in order to establish a Bluetooth® Low Energy connection between the communication apparatus 901 and the printing apparatus 701, the communication apparatus 901 is to operate as a central apparatus, and the printing apparatus 701 is to operate as a peripheral apparatus. Roles involved in a Bluetooth® Low Energy communication have been described up to this point.

Next, print processing according to this embodiment will be described. Bluetooth® Low Energy is a communication scheme that can grasp an approximate distance to another Bluetooth® Low Energy apparatus. According to Bluetooth® Low Energy, a Bluetooth® Low Energy communication between the printing apparatus 701 and the communication apparatus 901 has two ranges of a communicable range and a printable range. The communicable range is a range where the presence of the other party can identify and where an advertising packet can be exchanged, for example. Theoretically, establishment of a Bluetooth® Low Energy connection and execution of printing can be implemented if a communication apparatus is brought closer to the communicable range print. According to this embodiment, however, a Bluetooth® Low Energy connection is not established if a communication apparatus is brought closer to the communicable range. According to this embodiment, a Bluetooth® Low Energy connection is established if a communication apparatus is brought closer to a printable range. Thus, a printed material can be output when a user requests the printed material.

The system outline according to this embodiment has been described up to this point. Configurations and operations of the apparatuses will be described in detail.

Configurations of Apparatuses

According to this embodiment, the printing apparatus 701 can transmit an advertising packet to notify a central apparatus (communication apparatus 901 in FIG. 10) of a print service availability status such as an ink status and a paper status. On the other hand, the printing apparatus 701 can scan an advertising packet from a peripheral apparatus (image capture apparatus 801 in FIG. 10), establish a connection if there is an advertising packet from the peripheral apparatus, and notify a print service availability status to the peripheral apparatus. This processing will be described below in detail.

Figure 7:
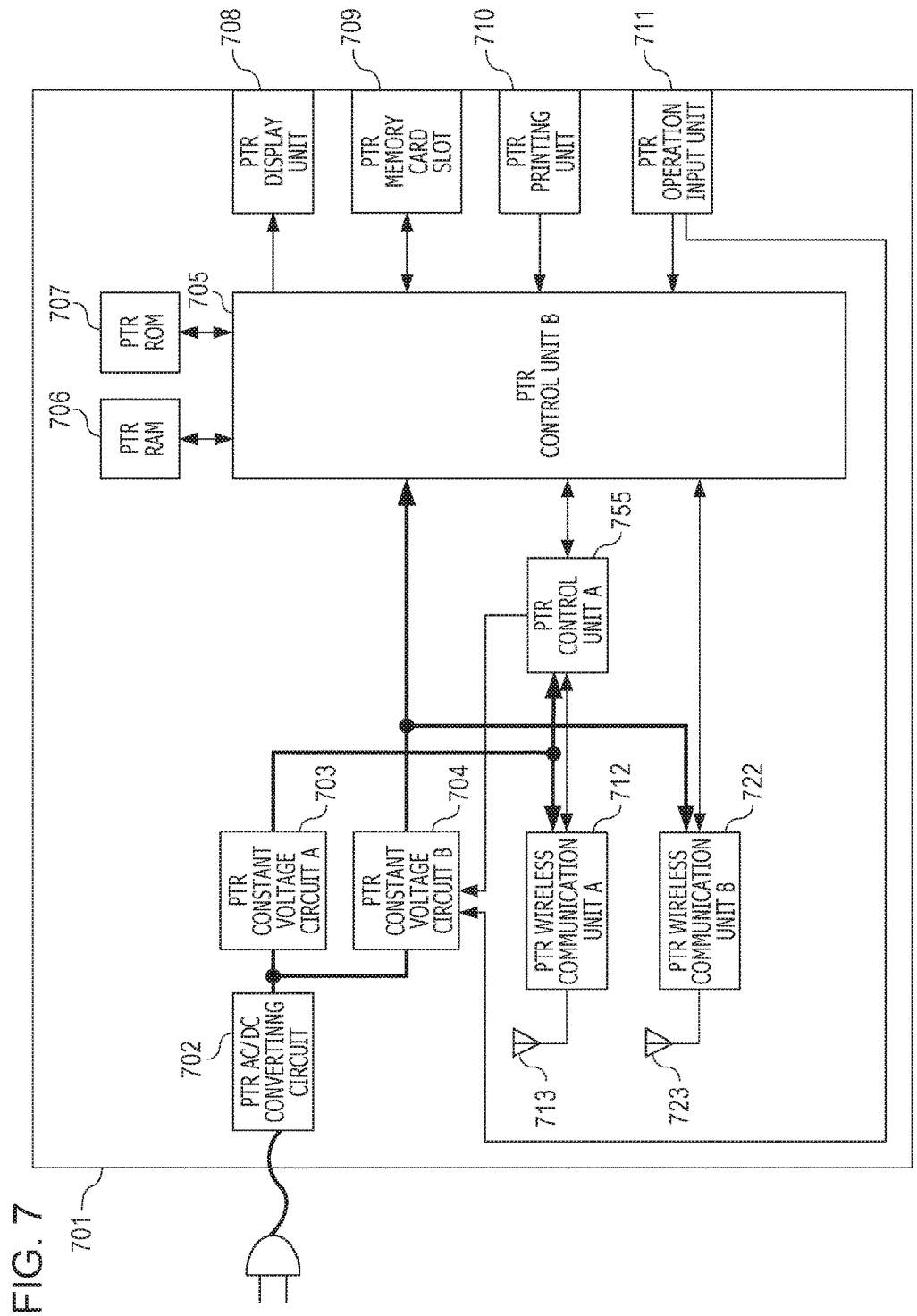
FIG. 7 is a block diagram illustrating a configuration example of the printing apparatus according to the first embodiment.

FIG. 7 is a block diagram illustrating a configuration example of the printing apparatus 701 according to this embodiment. The printing apparatus 701 may be an electrophotographic printer, an ink-jet printer, or a dye sublimation printer, for example.

A PTR control unit B 705 is a control unit configured to generally control the printing apparatus 701 and includes a CPU (Central Processing Unit). The PTR control unit 705 is a main system of the printing apparatus 701.

The PTR control unit B 705 can perform image processing for converting digital image data, for example, to data which are displayable on a display unit and which are printable onto a printing medium.

A PTR RAM 706 is a RAM (Random Access Memory) usable as a work area by the PTR control unit B 705 and may be a volatile memory such as a dynamic RAM.

A PTR ROM 707 is a ROM (Read Only Memory) configured to store a processing procedure to be performed by the PTR control unit B 705 and may be a rewritable nonvolatile memory such as a flash memory.

A PTR control unit A 755 is a control unit configured to control partial functions of the printing apparatus 701 and internally contains a RAM usable as a work area and a ROM storing a processing procedure. The PTR control unit A 755 is a subsystem of the printing apparatus 701.

The PTA control unit A 755 can operate even when the PTR control unit B 705 has an OFF state and consumes less power than the PTR control unit B 705. For example, the PTR control unit A 755 can be used for establishing a wireless communication connection with another apparatus in a stand-by state not providing a print service.

The PTA control unit A 755 can operate with a separate power supply circuit from that of the PTR control unit B 705. For example, the power supply circuit from the PTA control unit A 755 to the PTR control unit B 705 may be turned on to turn on the PTR control unit B 705 having an OFF state.

A PTR AC/DC converting circuit 702 is configured to convert AC voltage externally input from the printing apparatus 701 to DC voltage. An output converted to DC by the PTR AC/DC converting circuit 702 is further converted, by a PTR constant voltage circuit A 703 and a PTR constant voltage circuit B 704, to voltage suppliable to a circuit block in a subsequent stage.

The PTR constant voltage circuit A 703 is a constant voltage circuit configured to supply operating power to the PTR control unit A 755 and a PTR wireless communication unit A 712, which will be described below.

The PTR constant voltage circuit B 704 is a constant voltage circuit configured to supply operating power to the PTR control unit B 705 and a circuit block excluding the circuit block to which the PTR constant voltage circuit A 703 supplies operating power.

The PTR constant voltage circuit A 703 may be a circuit which can output voltage when the PTR control unit B 705 has an OFF state, and the PTR control unit A 755 can operate even when the PTR control unit B 705 has an OFF state.

The PTR constant voltage circuit B 704 is a circuit which can output voltage under signal control from the PTR control unit A 755 and others.

The PTR constant voltage circuit A 703 may supply less electric current and has lower electric current consumption than the PTR constant voltage circuit B 704.

The PTR wireless communication unit A 712 is a communicating unit which can perform short-range wireless communication with another apparatus. The short-range wireless communication to be performed by the PTR wireless communication unit A 712 supports Bluetooth® Low Energy which is a short-range wireless standard.

A PTR communication antenna A 713 is an antenna which can perform short-range wireless communication with another apparatus. It is assumed here that the PTR communication antenna A 713 is an antenna having a resonance frequency near a 2.4 GHz band being a UHF band, for example.

A PTR wireless communication unit B 722 is a communicating unit which can perform wireless communication with another apparatus. It is assumed here that the wireless communication to be performed by the PTR wireless communication unit B 722 supports IEEE802.11 which is a WLAN standard.

A PTR communication antenna B 723 is an antenna which can perform wireless communication with another apparatus. The PTR communication antenna B 723 may be an antenna having a resonance frequency near 2.4 GHz band being a UHF band, for example.

A PTR display unit 708 is a display unit which can display operation information on the printing apparatus 701 and an image to be printed and may be an LCD (Liquid Crystal Display), for example.

A PTR memory card slot 709 is a card slot to which a flash memory card holding digital data of an image printed can be inserted. The PTR control unit 705 can write and read digital data of an image recorded on a flash memory card inserted through the PTR memory card slot 709.

A PTR printing unit 710 is a printing unit configured to provide a print service of the printing apparatus 701. The PTR printing unit 710 may have a motor, a paper conveying mechanism, and a print head, for example, and can print data image-processed by the PTR control unit B 705 onto a printing medium.

According to this embodiment, the printing medium will be called paper.

A PTR operation input unit 711 is an operation input unit having operating keys and buttons, for example, and can inform user operation information to the PTR control unit B 705 and can turn on the PTR constant voltage circuit B 704 and turn on the PTR control unit B 705 in response to a user's operation.

The configuration of the printing apparatus 701 has been described up to this point. It is not intended that the configuration of the printing apparatus 701 is limited to the aforementioned configuration. For example, one hardware module can function as a plurality of units, or, conversely, a plurality of hardware modules can cooperate to function as one unit. This point is true for an image capture apparatus 801 and a communication apparatus 901, which will be described below.

Figure 8:
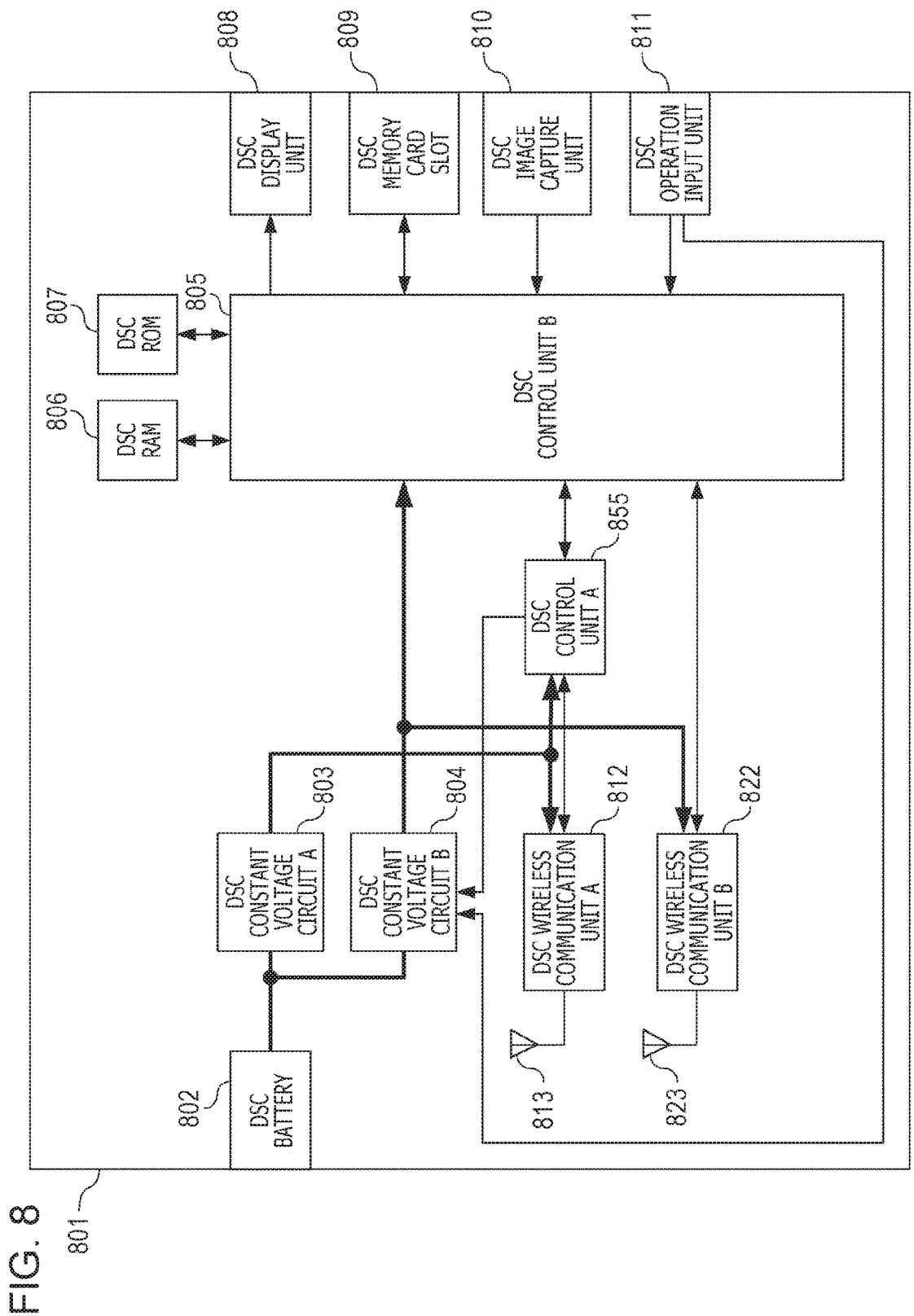
FIG. 8 is a block diagram illustrating a configuration example of the image capture apparatus according to the first embodiment.

FIG. 8 is a block diagram illustrating a configuration example of an image capture apparatus according to this embodiment.

A DSC control unit B 805 is a control unit configured to generally control the image capture apparatus 801 and includes a CPU (Central Processing Unit). The DSC control unit B 805 is a main system of the image capture apparatus 801.

The DSC control unit B 805 can perform image processing for converting digital image data, for example, to data which are displayable on a display unit and which is recordable onto a recording medium.

A DSC RAM 806 is a RAM (Random Access Memory) usable as a work area by the DSC control unit B 805 and may be a volatile memory such as a dynamic RAM.

A DSC ROM 807 is a ROM (Read Only Memory) configured to store a processing procedure to be performed by the DSC control unit B 805 and may be a rewritable nonvolatile memory such as a flash memory.

A DSC control unit A 855 is a control unit configured to control partial functions of the image capture apparatus 801 and internally contains a RAM usable as a work area and a ROM storing a processing procedure. The DSC control unit A 855 is a subsystem of the image capture apparatus 801.

The DSC control unit A 855 can operate even when the DSC control unit B 805 has an OFF state and consumes less power than the DSC control unit B 805. For example, the DSC control unit A 855 can be used for establishing a wireless communication connection with another apparatus in a stand-by state not providing image capturing and image transfer services.

The DSC control unit A 855 can operate with a separate power supply circuit from that of the DSC control unit B 805. For example, the power supply circuit from the DSC control unit A 855 to the DSC control unit B 805 may be turned on to turn on the DSC control unit B 805 having an OFF state.

A DSC battery 802 is a battery which can supply power to the image capture apparatus 801 and may be a lithium ion battery.

An output of the DSC battery 802 is converted by a DSC constant voltage circuit A 803 and a DSC constant voltage circuit B 804 to voltage which can be supplied to a circuit block in a subsequent stage.

The DSC constant voltage circuit A 803 is a constant voltage circuit configured to supply operating power to the DSC control unit A 855 and a DSC wireless communication unit A 812, which will be described below.

The DSC constant voltage circuit B 804 is a constant voltage circuit configured to supply operating power to the DSC control unit B 805 and a circuit block excluding the circuit block to which the DSC constant voltage circuit A 803 supplies operating power.

The DSC constant voltage circuit A 803 may be a circuit which can output voltage when the DSC control unit B 805 has an OFF state, and the DSC control unit A 855 can operate even when the DSC control unit B 805 has an OFF state.

The DSC constant voltage circuit B 804 is a circuit which can output voltage under signal control from the DSC control unit A 855 and others.

The DSC constant voltage circuit A 803 may supply less electric current and has lower electric current consumption than the DSC constant voltage circuit B 804.

The DSC wireless communication unit A 812 is a communicating unit which can perform short-range wireless communication with another apparatus. The short-range wireless communication to be performed by the DSC wireless communication unit A 812 supports Bluetooth® Low Energy which is a short-range wireless standard.

A DSC communication antenna A 813 is an antenna which can perform short-range wireless communication with another apparatus. It is assumed here that the DSC communication antenna A 813 is an antenna having a resonance frequency near a 2.4 GHz band being a UHF band, for example.

A DSC wireless communication unit B 822 is a communicating unit which can perform wireless communication with another apparatus. It is assumed here that the wireless communication to be performed by the DSC wireless communication unit B 822 supports IEEE802.11 which is a WLAN standard.

A DSC communication antenna B 823 is an antenna which can perform wireless communication with another apparatus. The DSC communication antenna B 823 may be an antenna having a resonance frequency near 2.4 GHz band being a UHF band, for example.

A DSC display unit 808 is a display unit which can display operation information regarding the image capture apparatus 801 and an image to be printed and may be an LCD (Liquid Crystal Display), for example.

A DSC memory card slot 809 is a card slot to which a flash memory card for recording digital data of an image can be inserted. The DSC control unit B 805 can write and read captured digital image data to and from a flash memory card inserted through the DSC memory card slot 809.

A DSC image capture unit 810 is an image capture unit configured to provide an image capturing service of the image capture apparatus 801. The DSC image capture unit 810 may include an optical unit having a lens and a driving system therefor, for example, and an image capture device. Video data captured by an image capture device can be image-processed by the DSC control unit B 805 and can be recorded to a recording medium.

A DSC operation input unit 811 is an operation input unit having operating keys and buttons, for example, and can inform user operation information to the DSC control unit B 805 and can turn on the DSC constant voltage circuit B 801 and turn on the DSC control unit B 805 in response to a user's operation.

Figure 9:
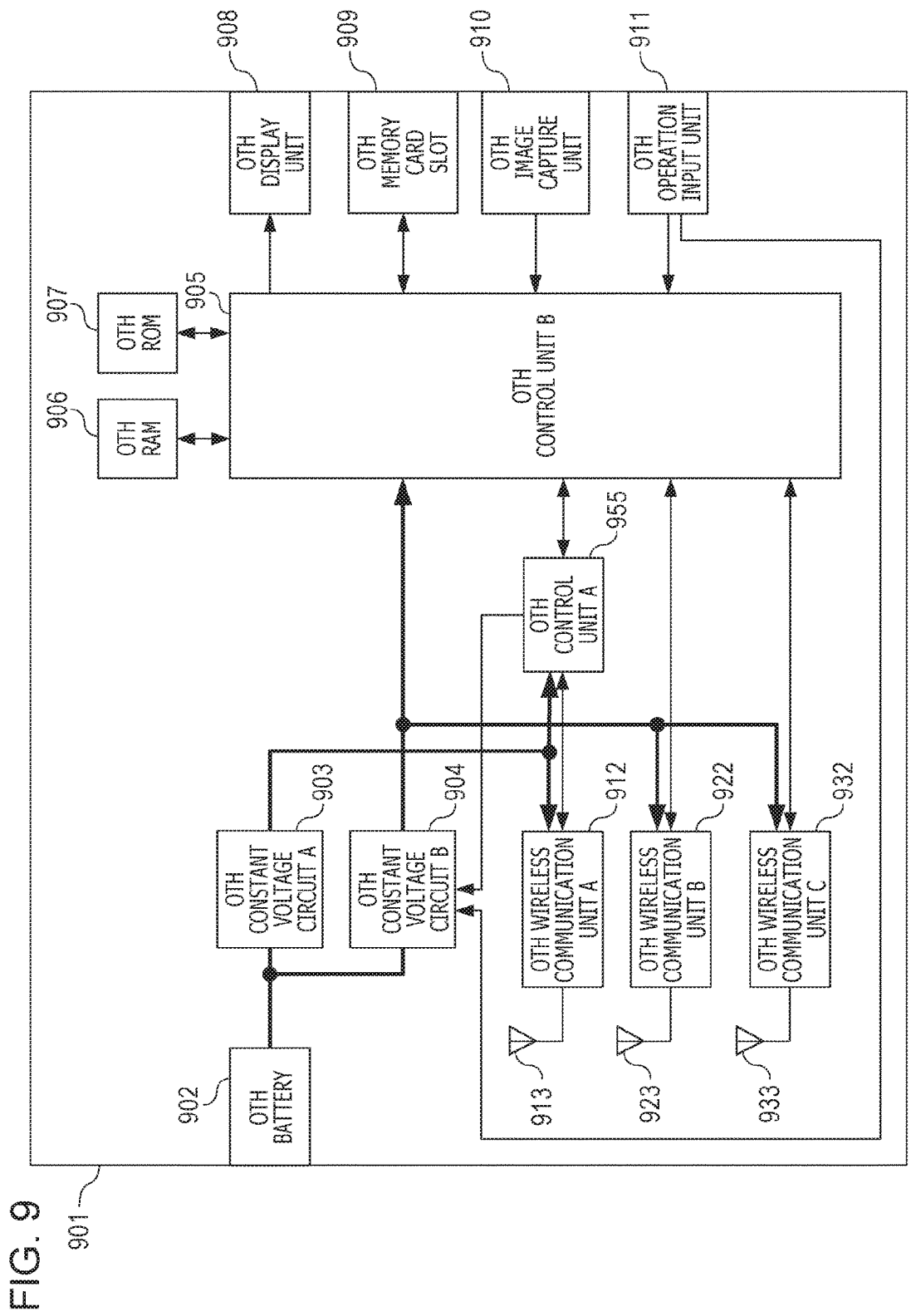
FIG. 9 is a block diagram illustrating a configuration example of the communication apparatus according to the first embodiment.

FIG. 9 is a block diagram illustrating a configuration example of a communication apparatus according to this embodiment. The block diagram to be used for describing this embodiment does not illustrate power supply connection to blocks not referred in the description of this embodiment. The block diagram does not illustrate details of blocks and operations not referred in the description of this embodiment.

Referring to FIG. 9, a communication apparatus 901 is an apparatus which can perform video capturing and wireless communication through a public wireless communication line. An example of the communication apparatus 901 may be a cellular phone such as a smart phone as described above, a so-called tablet device, a personal computer, or a digital television.

An OTH control unit B 905 is a control unit configured to generally control the communication apparatus 901 and includes a CPU (Central Processing Unit). The OTH control unit B 905 is a main system of the communication apparatus 901.

The OTH control unit B 905 can perform image processing for converting digital image data, for example, to data which is displayable on a display unit and which is recordable onto a recording medium.

An OTH RAM 906 is a RAM (Random Access Memory) usable as a work area by the OTH control unit B 905 and may be a volatile memory such as a dynamic RAM.

An OTH ROM 909 is a ROM (Read Only Memory) configured to store a processing procedure to be performed by the OTH control unit B 905 and may be a rewritable nonvolatile memory such as a flash memory.

An OTH control unit A 955 is a control unit configured to control partial functions of the communication apparatus 901 and internally contains a RAM usable as a work area and a ROM storing a processing procedure. The OTH control unit A 955 is a subsystem of the communication apparatus 901.

The OTH control unit A 955 can operate even when the OTH control unit B 905 has an OFF state and consumes less power than the OTH control unit B 905. For example, the OTH control unit A 955 can be used for establishing a wireless communication connection with another apparatus in a stand-by state not providing image capturing and image transfer services.

The OTH control unit A 955 can operate with a separate power supply circuit from that of the OTH control unit B 905. For example, the power supply circuit from the OTH control unit A 955 to the OTH control unit B 905 may be turned on to turn on the OTH control unit B 905 having an OFF state.

An OTH battery 902 is a battery which can supply power to the communication apparatus 901 and may be a lithium ion battery, for example.

An output of the OTH battery 902 is further converted, by an OTH constant voltage circuit A 903 and an OTH constant voltage circuit B 904, to voltage suppliable to a circuit block in a subsequent stage.

The OTH constant voltage circuit A 903 is a constant voltage circuit configured to supply operating power to the OTH control unit A 955 and an OTH wireless communication unit A 912, which will be described below.

The OTH constant voltage circuit B 904 is a constant voltage circuit configured to supply operating power to the OTH control unit B 905 and a circuit block excluding the circuit block to which the OTH constant voltage circuit A 903 supplies operating power.

The OTH constant voltage circuit A 903 may be a circuit which can output voltage when the OTH control unit B 905 has an OFF state, and the OTH control unit A 955 can operate even when the OTH control unit B 905 has an OFF state.

The OTH constant voltage circuit B 904 is a circuit which can output voltage under signal control from the OTH control unit A 955 and others.

The OTH constant voltage circuit A 903 may supply less electric current and has lower electric current consumption than the OTH constant voltage circuit B 904.

The OTH wireless communication unit A 912 is a communicating unit which can perform short-range wireless communication with another apparatus. The short-range wireless communication to be performed by the OTH wireless communication unit A 912 supports Bluetooth® Low Energy which is a short-range wireless standard.

An OTH communication antenna A 913 is an antenna which can perform short-range wireless communication with another apparatus. It is assumed here that the OTH communication antenna A 913 is an antenna having a resonance frequency near a 2.4 GHz band being a UHF band, for example.

An OTH wireless communication unit B 922 is a communicating unit which can perform wireless communication with another apparatus. It is assumed here that the wireless communication to be performed by the OTH wireless communication unit B 922 supports IEEE802.11 which is a WLAN standard.

An OTH communication antenna B 923 is an antenna which can perform wireless communication with another apparatus. The OTH communication antenna B 923 may be an antenna having a resonance frequency near 2.4 GHz band being a UHF band, for example.

The OTH wireless communication unit C 932 is a communicating unit which can perform wireless communication with another apparatus through a public wireless communication line and a base station. The wireless communication to be performed by the OTH wireless communication unit C 932 supports 3G or 4G mobile communication system provided by International Telecommunication Union (ITU).

An OTH communication antenna C 933 is an antenna which can perform wireless communication with another apparatus. The OTH communication antenna C 933 has a resonance frequency near a UHF band and an SHF band such as 400 to 900 KHz bands, a 2 GHz band, and a 3 GHz band.

An OTH display unit 908 is a display unit which can display operation information regarding the communication apparatus 901 and an image to be printed and may be an LCD (Liquid Crystal Display), for example.

An OTH memory card slot 909 is a card slot to which a flash memory card for recording digital data of an image can be inserted. The OTH control unit B 905 can write and read captured digital image data to and from a flash memory card inserted through the OTH memory card slot 909.

The OTH image capture unit 910 is an image capture unit providing an image capturing service of the communication apparatus 901. The OTH image capture unit 910 may include an optical unit having a lens and a driving system therefor, for example, and an image capture device. Video data captured by an image capture device can be image-processed by the DSC control unit B 905 and can be recorded to a recording medium. An OTH operation input unit 911 is an operation input unit having operating keys and buttons, for example, and can inform user operation information to the OTH control unit B 905 and can turn on the OTH constant voltage circuit B 904 and turn on the OTH control unit B 905 in response to a user's operation.

The configurations of the apparatuses have been described up to this point. Next, processing to be performed in the apparatuses will be described in detail.

Details of Processing

FIG. 1 is a flowchart illustrating processing in the printing apparatus 701. FIG. 1 is a flowchart illustrating a print service availability status notification and a printing procedure to be performed by the printing apparatus 701 according to this embodiment. Processes are to be executed by the PTR control unit A 755 in the printing apparatus 701 unless otherwise specified. The flowchart in FIG. 1 starts in response to external input of AC voltage to the PTR AC/DC converting circuit 702 in the printing apparatus 701. The flowchart may be started in response to a specific operation (such as a specific button operation or menu operation) on the printing apparatus 701. The same is true for the flowcharts in FIGS. 2 and 3, which will be described below.

In S101, the printing apparatus 701 sets the PTR wireless communication unit A 712 as a peripheral role. The printing apparatus 701 sets the role of the PTR wireless communication unit A 712 to a peripheral role in S101 so that it can operate as a Bluetooth® Low Energy peripheral apparatus.

In S102, the printing apparatus 701 determines whether there is an error due to ink. More specifically, whether ink is mounted to the PTR printing unit 710. If it is determined in S102 that there is no ink, the printing apparatus 701 stores no-ink error information in S103. Then, the processing moves to S104. If the printing apparatus 701 determines in S102 that there is ink, the processing moves to S104.

In S104, the printing apparatus 701 determines whether there is an error due to a print paper. More specifically, the printing apparatus 701 determines whether the PTR printing unit 710 is loaded with paper. If the printing apparatus 701 in S104 determines that there is no paper, no-paper error information is stored in S105. Then, the processing moves to S106. If the printing apparatus 701 in S104 determines that there is paper, the processing moves to S106.

In S106, the printing apparatus 701 determines whether there are ink and paper in the PTR printing unit 710 and the sizes of the ink and paper are matched. The determination in S106 is a process for determination in an inked ribbon printing apparatus which prints by using a combination of an inked ribbon having a regular inked surface and paper suitable for the regular inked surface, for example.

If the printing apparatus 701 in S106 determines that there is no ink and paper or that the sizes of ink and paper are not matched, the processing moves to S107 where size unmatched error information is stored. Then, the processing moves to S108.

In S108, the printing apparatus 701 transmits an advertising packet indicating a print service availability status from the PTR wireless communication unit A 712 based on the stored error information. Then, the processing moves to S111. The advertising packet transmission in S108 is performed repetitively at predetermined time intervals for a predefined time period. By transmitting the advertising packet, the printing apparatus 701 being a peripheral apparatus can cause the central apparatus (the communication apparatus 901 in FIG. 10) to recognize the presence of the printing apparatus 701.

A plurality of types of advertising packet can be generated based on the status of the printing apparatus 701 for transmission from the printing apparatus 701 in S108. More specifically, the printing apparatus 701 can generate an advertising packet by selecting one of combination examples (B) to (E) of print service availability status and notification information in FIG. 4 based on the ink and paper statuses.

FIGS. 5B to 5E illustrate data examples in an advertising packet indicating a print service availability status to be transmitted from the printing apparatus 701 to the PTR wireless communication unit A 712 in S108.

For example, a case where there is paper but no ink corresponds to a combination example (B) in FIG. 4, and the print service availability status is "NO". The notification information includes UUID 2 for identifying Service 2 (NO_INK) within data in an advertising packet to generate an advertising packet as illustrated in FIG. 5B.

UUID Stands for Universally Unique IDentifier.

A case where there is no paper but there is ink corresponds to a combination example (C) in FIG. 4, and the print service availability status is "NO". The notification information includes UUID 3 for identifying Service 3 (NO_PAPER) within data in an advertising packet to generate an advertising packet as illustrated in FIG. 5C.

A case where there is no paper and no ink corresponds to a combination example (D) in FIG. 4, and the print service availability status is "NO". The notification information includes UUID 4 for identifying Service 4 (NO_INK_NO_PAPER) within data in an advertising packet to generate an advertising packet as illustrated in FIG. 5D.

A case where there are paper and ink but their sizes are not matched corresponds to a combination example (E) in FIG. 4, and the print service availability status is "NO". The notification information includes UUID 5 for identifying Service 5 (UNMATCH_SIZE) within data in an advertising packet to generate an advertising packet as illustrated in FIG. 5E.

If the printing apparatus 701 in S106 determines that there are ink and paper and that the sizes of the ink and the paper are matched, the processing moves to S109.

In S109, the printing apparatus 701 transmits an advertising packet indicating a print service availability status from the PTR wireless communication unit A 712. The processing then moves to S110.

The advertising packet transmission in S109 is performed repetitively at predetermined time intervals for a predefined time period.

The advertising packet to be transmitted from the printing apparatus 701 is generated by selecting a combination example (A) in FIG. 4 of the print service availability status and notification information in FIG. 4 based on the ink and paper statuses.

Figure 5A:
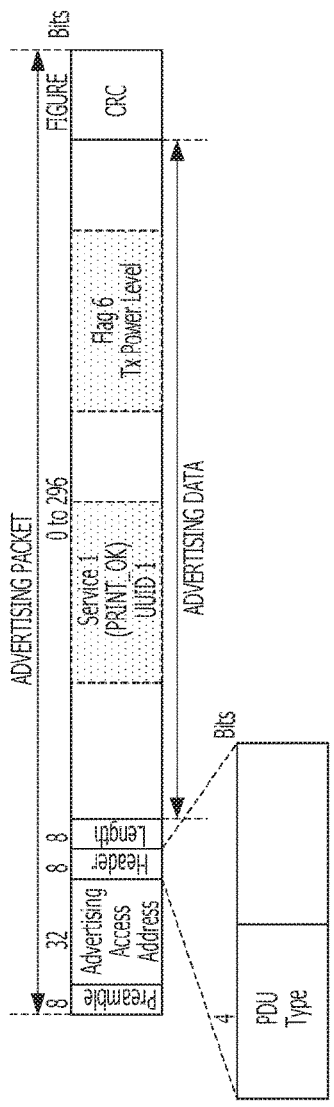
FIGS. 5A to 5E illustrate data examples of an advertising packet in a printing apparatus according to the first embodiment.
Figure 5B:
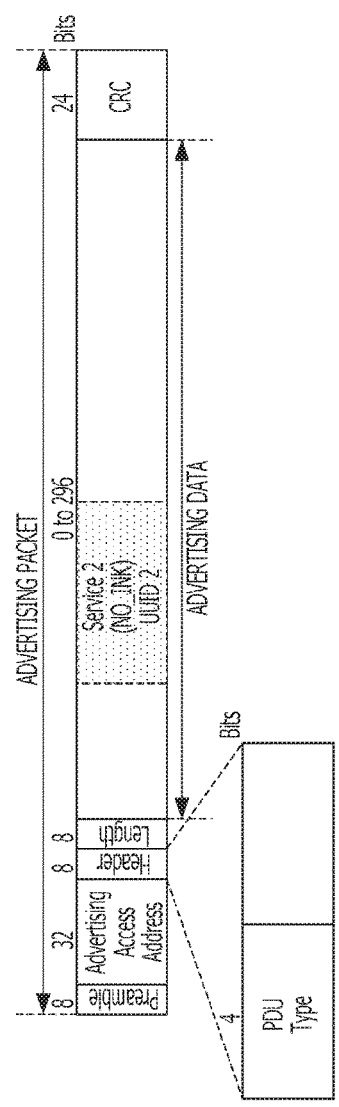
Figure 5C:
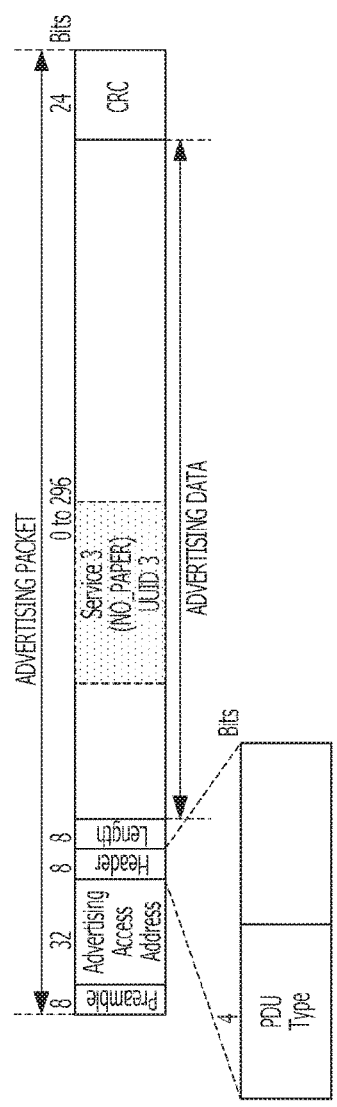
Figure 5D:
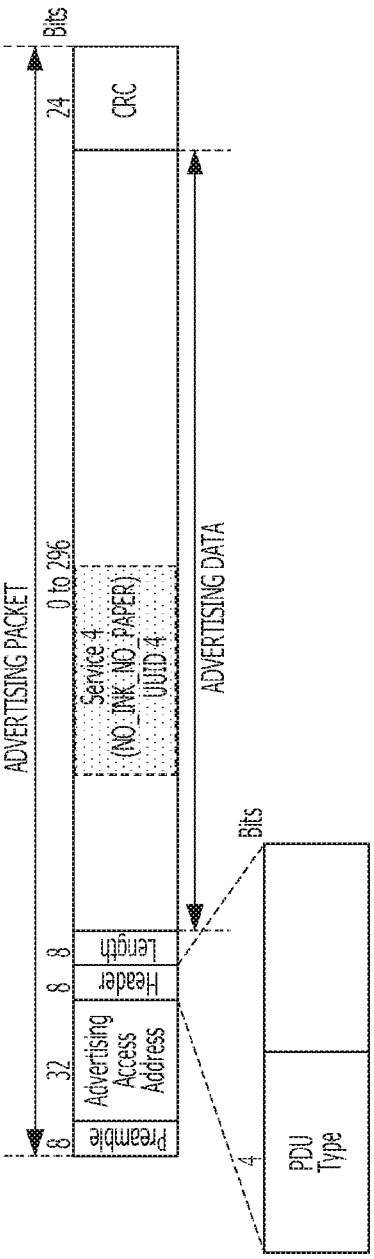
Figure 5E:
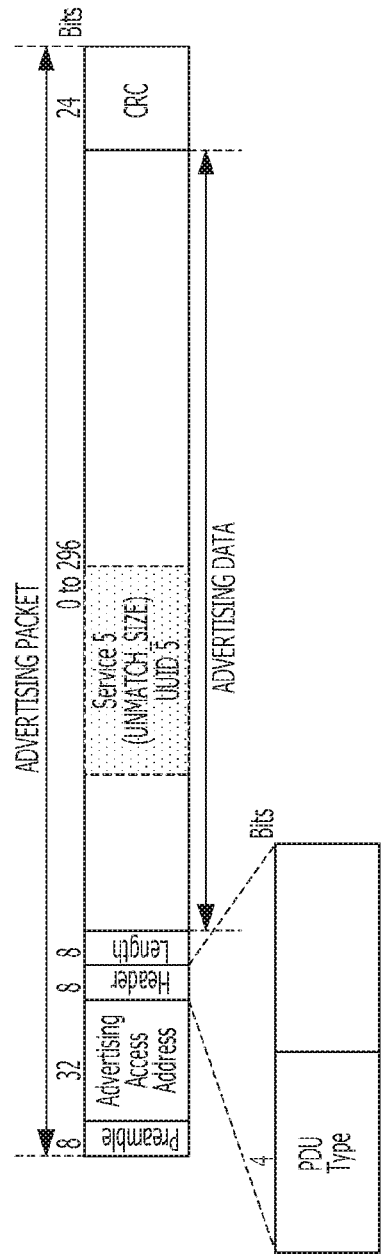

FIG. 5A illustrates a data example in an advertising packet indicating a print service availability status to be transmitted by the printing apparatus 701 in S109 from the PTR wireless communication unit A 712.

A case where there is paper and ink and that their sizes are matched corresponds to the combination example (A), and the print service availability status is "YES". The notification information includes UUID 1 for identifying Service 1 (PRINT_OK) within data in an advertising packet to generate an advertising packet as illustrated in FIG. 5A.

As in the data example in the advertising packet in FIG. 5A, the advertising packet may include a flag (Flag 6) indicating transmission power (TxPowerLevel) so that detection of an approach based on a normalization field intensity, which will be described below, can be used to trigger start of a print service, in addition to UUID 1.

The flag (Flag 6) in the data example in the advertising packet in FIG. 5A includes numerical data of transmission power (TxPowerLevel) set in the PTR wireless communication unit A 712 by the printing apparatus 701.

The advertising packet including a UUID as described above is scanned and obtained by a central apparatus to notify a print service availability status of the printing apparatus 701.

If data in an advertising packet transmitted by the printing apparatus 701 include UUID 1 for identifying Service 1 (PRINT_OK), a central apparatus can execute the print service by using the PTR printing unit 710 in the printing apparatus 701.

If data in an advertising packet transmitted by the printing apparatus 701 include one of UUID 2 to UUID 5, the central apparatus is notified that the print services cannot be executed in the PTR printing unit 710 in the printing apparatus 701 and the causes of the errors.

Figure 10:
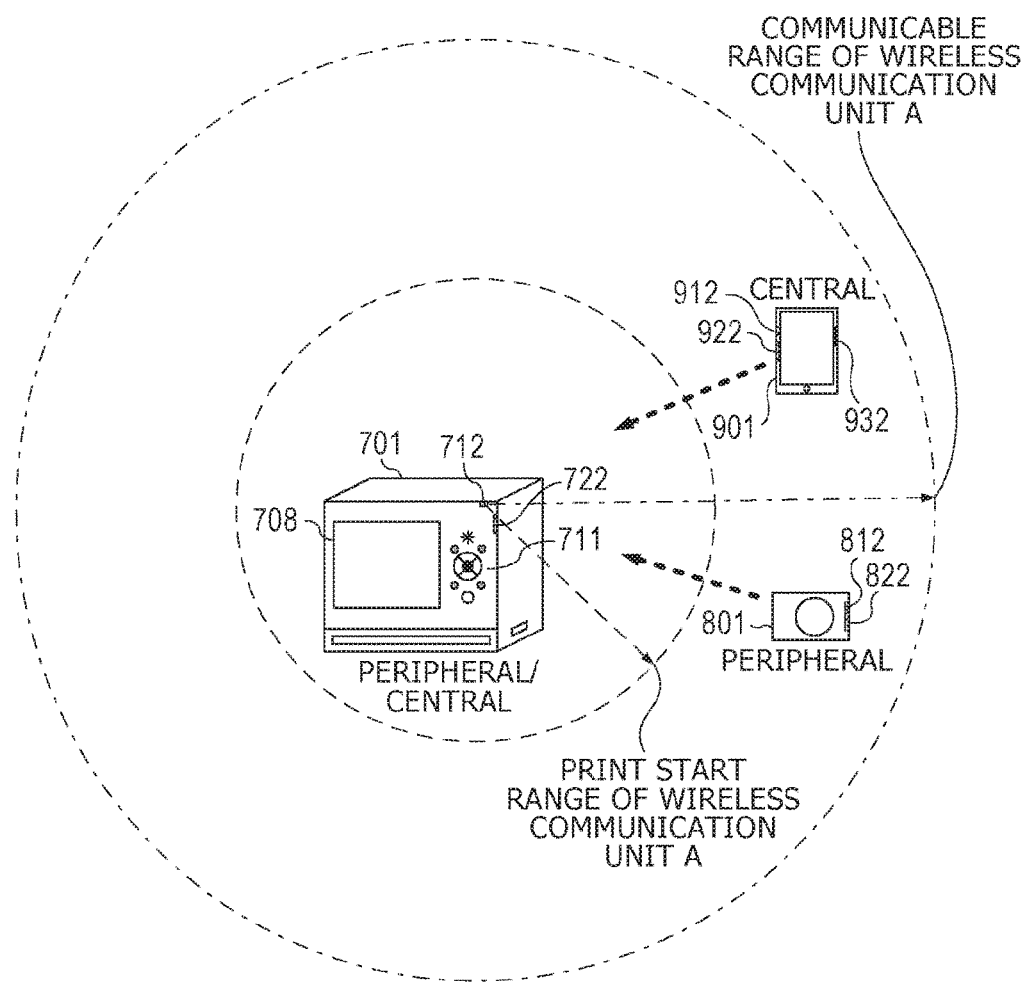
FIG. 10 illustrates a layout example of the printing apparatus, the image capture apparatus, and the communication apparatus according to the first embodiment.

In S110, the printing apparatus 701 determines whether the PTR wireless communication unit A 712 has a connection request from a central apparatus (the communication apparatus 901 in FIG. 10). If the printing apparatus 701 determines in S110 that there is a connection request from the central apparatus, the processing moves to S124. In S124, a Bluetooth® Low Energy communication link with the central apparatus is established.

If the printing apparatus 701 determines in S110 that there is no connection request from the central apparatus, the processing moves to S111. In S111, the printing apparatus 701 sets a central role as a role of the PTR wireless communication unit A 712. The printing apparatus 701 sets the role of the PTR wireless communication unit A 712 to a central role in S111 so that it can operate as a Bluetooth® Low Energy central apparatus.

In S112, the printing apparatus 701 scans an advertising packet from another peripheral apparatus in the PTR wireless communication unit A 712.

In S113, the printing apparatus 701 determines whether the advertising packet scanned in S112 includes UUID 7 for identifying Service 7 (PRINT_STATUS_REQ). This is a UUID corresponding to a print status request service and is transmitted by the image capture apparatus 801 in S202 in FIG. 2, which will be described below.

If it is determined in S113 that the advertising packet includes UUID 7 for identifying Service 7 (PRINT_STATUS_REQ), the processing moves to S114. FIG. 6A illustrates an exemplary advertising packet including UUID 7.

The printing apparatus 701 transmits a connection request to another peripheral apparatus having transmitted the advertising packet including QUID 7 in S114 and establishes a Bluetooth® Low Energy communication link therewith in S115.

In S116, the printing apparatus 701 determines whether an error status occurs in which the PTR printing unit 710 cannot execute the print service.

The determination in S116 specifically includes determination that an error status did not occur for the combination example (A) of the print service availability status and the notification information in FIG. 4 and determination that an error status occurred for one of combination examples (B) to (E) of the print service availability status and the notification information in FIG. 4.

If the printing apparatus 701 in S116 determines that an error status is occurring in which the PTR printing unit 710 cannot execute the print service, the processing moves to S117.

In S117, the printing apparatus 701 notifies information regarding one of the combination examples (B) to (E) of the print service availability status and the notification information in FIG. 4 to the peripheral apparatus with which a Bluetooth® Low Energy communication link has been established, and the processing moves to S118. The Bluetooth® Low Energy communication link is terminated in S118, and the processing returns to S101.

The print service availability status and the information are notified in S117 specifically through VALUE in a database in a GATT server storing Services and Characteristics of a peripheral apparatus.

A Characteristic VALUE in a database in the GATT server in a peripheral apparatus may include information such as "print service availability" or "print service availability status".

The printing apparatus 701 can notify the peripheral apparatus with which a Bluetooth® Low Energy communication link is established of a print service availability status by using a Characteristic VALUE in the database in the GATT server in the peripheral apparatus.

If the printing apparatus 701 in S116 determines that an error status occurs in which the PTR printing unit 710 cannot execute the print service, the processing moves to S118. The Bluetooth® Low Energy communication link is terminated in S118, and the processing returns to S101.

If the printing apparatus 701 in S113 determines that there is not an advertising packet including UUID 7 for identifying Service 7 (PRINT_STATUS_REQ), the processing moves to S119.

In S119, the printing apparatus 701 determines whether the advertising packet scanned in S112 includes UUID 8 for identifying Service 8 (PRINT_REQ). This is a UUID corresponding to a print request service and is transmitted by the image capture apparatus 801 in S211 in FIG. 2, which will be described below.

It is assumed that the advertising packet in S119 includes UUID 8 for identifying Service 8 (PRINT_REQ)) within data in the advertising packet, as illustrated in include, FIG. 6B.

As in the data example in the advertising packet in FIG. 6B, the advertising packet may include a flag (Flag 6) indicating transmission power (TxPowerLevel) so that detection of an approach based on a normalization field intensity, which will be described below, can be used to trigger start of a print service, in addition to UUID 8.

The flag (Flag 6) in the data example in the advertising packet in FIG. 6B includes numerical data of transmission power (TxPowerLevel) set when the peripheral apparatus transmits the advertising packet.

If it is determined in S119 that UUID 8 for identifying Service 8 (PRINT REQ) does not exist, the processing returns to S101.

If it is determined in S119 that UUID 8 for identifying Service 8 (PRINT_REQ) exists, the processing moves to S120.

In S120, the printing apparatus 701 determines whether the peripheral apparatus having transmitted the advertising packet including UUID 8 for identifying the Service 8 has a normalization field intensity equal to or higher than a threshold value.

The determination regarding the normalization field intensity in S120 applies a numerical value of the transmission power (TxPowerLevel) set by the peripheral apparatus and included in the flag (Flag 6), as in the data example in the advertising packet in FIG. 6B.

For example, the normalization field intensity L8 can be expressed as L8=L8B−L8A [dB] where the transmission power numerical value is L8A [dB], and the reception signal intensity of the advertising packet received by the PTR wireless communication unit A 712 in the printing apparatus 701 is L8B [dB].

If the printing apparatus 701 in S120 determines that the normalization field intensity L8 is not equal to or higher than a threshold value Lt8, the processing returns to S101.

If the printing apparatus 701 in S120 determines that the normalization field intensity L8 is equal to or higher than the threshold value Lt8, the processing moves to S121.

In S121, the printing apparatus 701 transmits a connection request to another peripheral apparatus having transmitted an advertising packet including QUID 8. A Bluetooth® Low Energy communication link is established in S122.

In S125, the printing apparatus 701 performs WLAN handover with the apparatus to which the Bluetooth® Low Energy communication link has been established in S124 or S122. The term "WLAN handover" specifically refers to sharing of an SSID and connection password information in a Bluetooth® Low Energy communication of the PTR wireless communication unit A 712 and establishment of a WLAN communication link with an apparatus establishing the Bluetooth® Low Energy communication link by using the PTR wireless communication unit B 722.

In S126, the printing apparatus 701 receives data from the apparatus having established a WLAN communication link in the PTR wireless communication unit B 722, and the printing apparatus 701 executes a print service in the PTR printing unit 710. The printing apparatus 701 terminates the WLAN communication and the processing moves to S127. More specifically, in response to a print request from the image capture apparatus 801 or the communication apparatus 901, the printing apparatus 701 starts a print sequence. The printing apparatus 701 receives content data from the image capture apparatus 801 or the communication apparatus 901 and prints it in the printing unit thereof.

In S127, the printing apparatus 701 terminates the Bluetooth® Low Energy communication link and exits the flowchart in FIG. 1.

In the flowchart in FIG. 1, the processing from S113 to S118 and from S113 to S120 is performed inside a communicable range of the wireless communication unit A and outside a print start range of the wireless communication unit A in the apparatus layout example in FIG. 10.

Referring to the apparatus layout example in FIG. 10, the expression "inside a communicable range of the wireless communication unit A" refers to a range where a Bluetooth® Low Energy communication link is established between the PTR wireless communication unit A 712 and the DSC wireless communication unit A 812 so that they are communicable.

Referring to the apparatus layout example illustrated in FIG. 10, the expression "print start range of the wireless communication unit A" refers to a range where a Bluetooth® Low Energy communication link is established between the PTR wireless communication unit A 712 and the DSC wireless communication unit A 812 so that they are communicable and where the normalization field intensity L8 as described above is equal to or higher than the threshold value Lt8.

Figure 2:
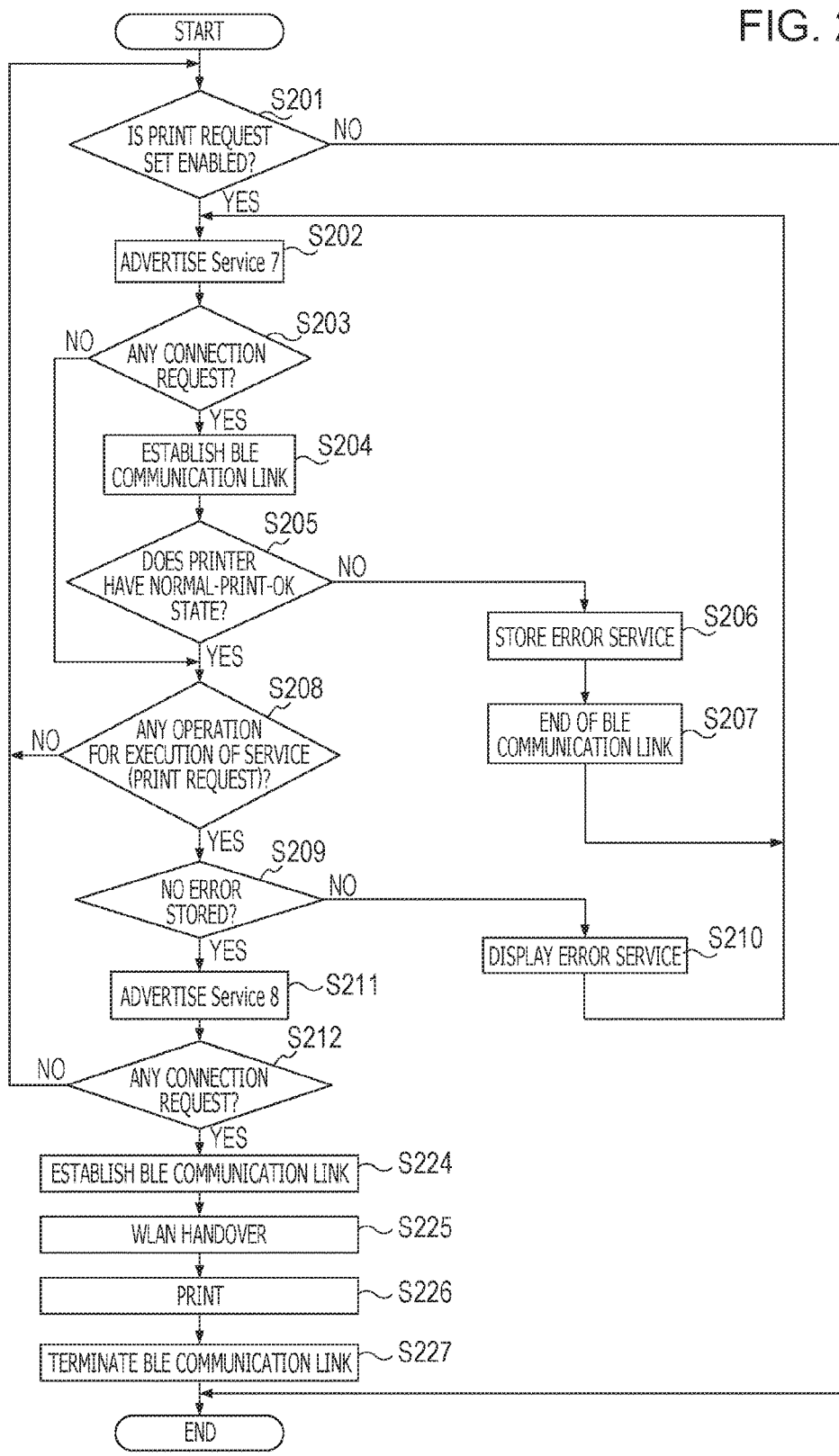
FIG. 2 is a flowchart illustrating a printing procedure in an image capture apparatus according to the first embodiment.

With reference to FIG. 2, a flowchart for the image capture apparatus 801 will be described. FIG. 2 is a flowchart illustrating a printing procedure to be performed in the image capture apparatus 801 according to this embodiment. Processes thereon are executed by the DSC control unit A 855 in the image capture apparatus 801 unless otherwise specified. The flowchart in FIG. 2 is started in response to attachment of the DSC battery 802 for the image capture apparatus 801.

In S201, whether the image capture apparatus 801 has a setting enabling a print request is determined. The expression "setting enabling a print request" in S201 refers to a setting enabling to request execution of a print service to the printing apparatus 701 by using the DSC wireless communication unit A 812 in the image capture apparatus 801.

If it is determined in S201 that the image capture apparatus 801 does not have a setting enabling a print request, the processing exits the flowchart in FIG. 2.

If it is determined in S201 that the image capture apparatus 801 has a setting enabling a print request, the processing moves to S202. In S202, the image capture apparatus 801 transmits an advertising packet for a print status request service from the DSC wireless communication unit A 812. Then, the processing moves to S203.

The advertising packet transmission in S202 is performed repetitively at predetermined time intervals for a predefined time period.

FIG. 6A illustrates a data example of an advertising packet indicating a print status request service transmitted from the DSC wireless communication unit A 812 by the image capture apparatus 801 in S202.

The advertising packet transmitted in S202 includes UUID 7 identifying Service 7 (PRINT_STATUS_REQ) corresponding to the print status request service.

In S203, the image capture apparatus 801 determines whether a connection request from a central apparatus exists in the DSC wireless communication unit A 812. If the image capture apparatus 801 in S203 determines that a connection request from the central apparatus exists, the processing moves to S204. In S204, a Bluetooth® Low Energy communication link with the central apparatus is established so that the image capture apparatus 801 and the central apparatus can exchange their apparatus statuses with each other.

If the image capture apparatus 801 in S203 determines that a connection request from the central apparatus does not exist, the processing moves to S208.

The central apparatus which transmits a connection request to the image capture apparatus 801 in S203 is the printing apparatus 701 set to a central role in S111 and transmitting a connection request in S114 in the flowchart in FIG. 1.

In S204, the image capture apparatus 801 acquires information regarding one of combination examples (A) to (E) of the print service availability status and notification information of the printing apparatus 701 in FIG. 4.

In S205, the image capture apparatus 801 determines whether the print service availability status of the printing apparatus 701 the information on which is acquired in S204 is "NORMAL PRINT OK".

In S205, if the combination example of the print service availability status and the notification information in FIG. 4 acquired in S204 is (A), it is determined that the status is "NORMAL PRINT OK". If it is one of the combination examples (B) to (E) of the print service availability status and the notification information in FIG. 4, it s determined that the status is not "NORMAL PRINT OK".

If the image capture apparatus 801 in S205 determines that the print service availability status of the printing apparatus 701 is not "NORMAL PRINT OK", the image capture apparatus 801 in S206 stores a print service availability status error of the printing apparatus 701. In S207, the image capture apparatus 801 terminates the Bluetooth® Low Energy communication link. The processing then returns to S202.

If the image capture apparatus 801 in S205 determines that the print service availability status of the printing apparatus 701 is "NORMAL PRINT OK", the image capture apparatus 801 in S208 determines whether an operation for executing a print request service has been performed in response to an operation performed on the DSC operation input unit 811 by a user.

If the image capture apparatus 801 in S208 determines that an operation for executing a print request service has not been performed in response to an operation performed on the DSC operation input unit 811 by a user, the processing returns to S201.

If the image capture apparatus 801 in S208 determines that an operation for executing a print request service has been performed in response to an operation performed on the DSC operation input unit 811 by a user, the processing moves to S209. In S209, the image capture apparatus 801 determines whether the print service availability status error of the printing apparatus 701 is not stored.

The determination in S209 determines that the error is stored if the image capture apparatus 801 in S206 stores the print service availability status error of the printing apparatus 701 and, if not, determines that the error is not stored.

If the image capture apparatus 801 in S209 determines that the print service availability status error of the printing apparatus 701 is stored, the image capture apparatus 801 in S210 displays on the DSC display unit 808 error information describing that the print service of the printing apparatus 701 is disabled. The processing then returns to S202.

The content to be displayed on the DSC display unit 808 by the image capture apparatus 801 in S210 may be detail illustration of the print service availability status of the printing apparatus 701 based on information regarding one of combination examples (B) to (E) of the print service availability status and the notification information in FIG. 4.

If the image capture apparatus 801 in S209 determines that the print service availability status error of the printing apparatus 701 is not stored, the image capture apparatus 801 in S211 transmits an advertising packet of a print request service from the DSC wireless communication unit A 812. The processing moves to S212.

The advertising packet transmission in S211 is performed repetitively at predetermined time intervals for a predefined time period.

Not illustrated in the flowchart in FIG. 2, if the image capture apparatus 801 determines that an error in the print service availability status of the printing apparatus 701 is not stored, content indicating that the print service availability status is "YES" may be displayed on the DSC display unit 808.

FIG. 6B illustrates a data example of an advertising packet indicating a print status request service to be transmitted from the DSC wireless communication unit A 812 by the image capture apparatus 801 in S211.

The advertising packet to be transmitted in S211 includes UUID 8 for identifying Service 8 (PRINT_REQ) corresponding to a print request service.

As in the data example in the advertising packet in FIG. 6B, the advertising packet may include a flag (Flag 6) indicating transmission power (TxPowerLevel) so that detection of an approach based on a normalization field intensity, which will be described below, can be used to trigger start of a print service, in addition to UUID 8.

The flag (Flag 6) in the data example in the advertising packet in FIG. 6B includes numerical data of transmission power (TxPowerLevel) set in the DSC wireless communication unit A 812 by the image capture apparatus 801.

The advertising packet including a UUID as described above is scanned and obtained by a central apparatus to notify a print request service of the image capture apparatus 801.

The image capture apparatus 801 in S212 determines whether the DSC wireless communication unit A 812 has a connection request from a central apparatus. If the image capture apparatus 801 in S212 that there is a connection request from the central apparatus, the processing moves to S224. In S224, a Bluetooth® Low Energy communication link with the central apparatus is established so that the image capture apparatus 801 and the central apparatus can exchange their apparatus statuses with each other.

If the image capture apparatus 801 in S212 determines there is not a connection request from the central apparatus, the processing returns to S201.

The image capture apparatus 801 in S225 performs WLAN handover with the apparatus to which the Bluetooth® Low Energy communication link has been established in S224. The term "WLAN handover" specifically refers to sharing of an SSID and connection password information in a Bluetooth® Low Energy communication of the DSC wireless communication unit A 812 and establishment of a WLAN communication link with an apparatus establishing the Bluetooth® Low Energy communication link by using the DSC wireless communication unit B 822.

The image capture apparatus 801 in S226 transmits data to the apparatus establishing the WLAN communication link in the DSC wireless communication unit B 822, and the central apparatus or the printing apparatus 701 receiving the data performs a print service in the PTR printing unit 710.

The image capture apparatus 801 then terminates the WLAN communication link, and the processing moves to S227.

The image capture apparatus 801 in S227 terminates the Bluetooth® Low Energy communication link, and the flowchart in FIG. 2 ends.

In the flowchart in FIG. 2, the processing from S203 to S205 and from S203 to S207 through S205 is performed inside a communicable range of the wireless communication unit A and outside a print start range of the wireless communication unit A in the apparatus layout example in FIG. 10.

Referring to the apparatus layout example in FIG. 10, the expression "inside a communicable range of the wireless communication unit A" refers to a range where a Bluetooth® Low Energy communication link is established between the PTR wireless communication unit A 712 and the DSC wireless communication unit A 812 so that they are communicable.

Referring to the apparatus layout example illustrated in FIG. 10, the expression "print start range of the wireless communication unit A" refers to a range where a Bluetooth® Low Energy communication link is established between the PTR wireless communication unit A 712 and the DSC wireless communication unit A 812 so that they are communicable and where the normalization field intensity L8 as described above is equal to or higher than the threshold value Lt8.

Figure 3:
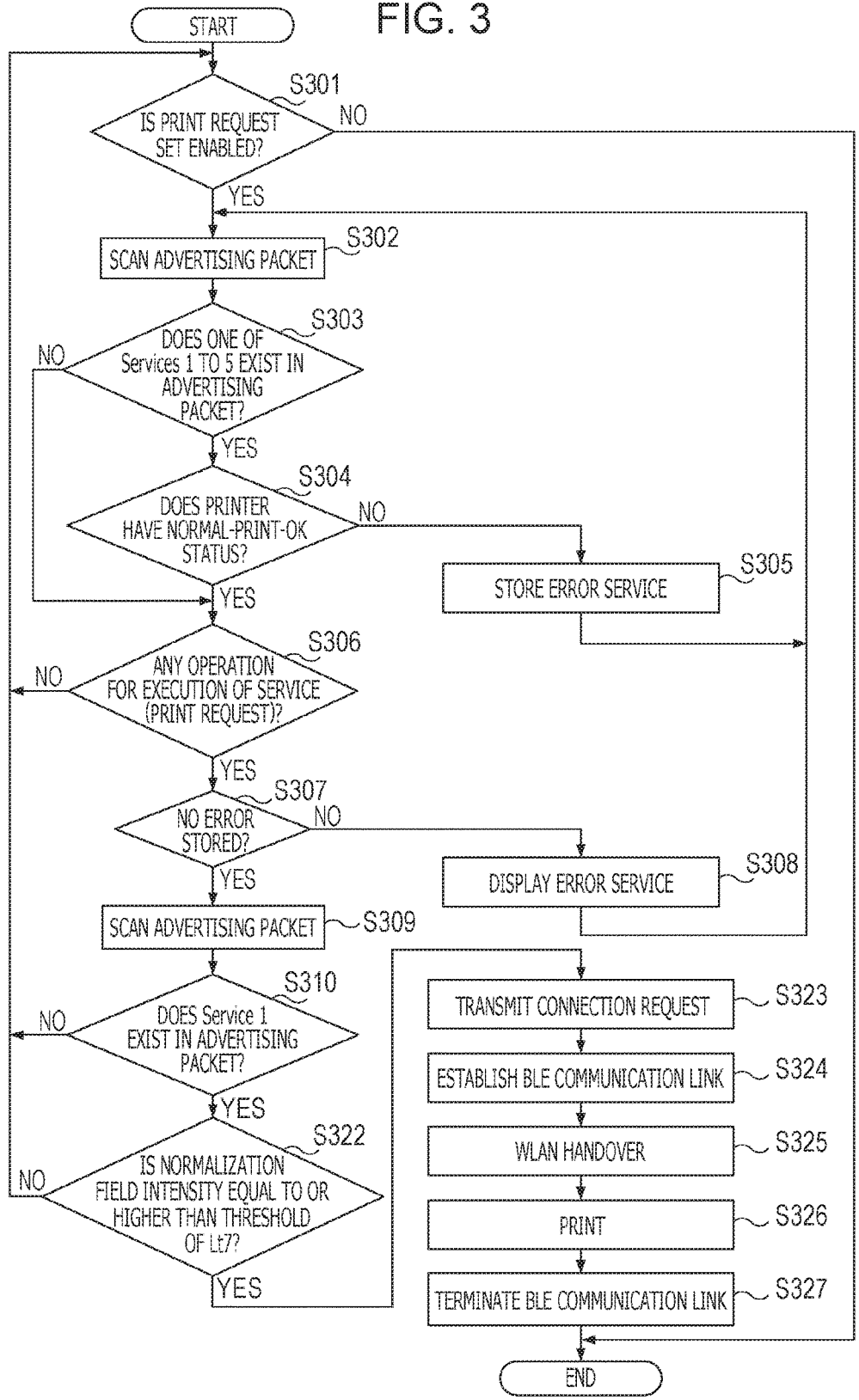
FIG. 3 is a flowchart illustrating a printing procedure in a communication apparatus according to the first embodiment.

With reference to FIG. 3, a flowchart for the communication apparatus 901 will be described. FIG. 3 is a flowchart illustrating a printing procedure to be performed in the communication apparatus 901 according to this embodiment. Processes thereon are executed by the OTH control unit A 955 in the communication apparatus 901 unless otherwise specified. The flowchart in FIG. 2 is started in response to attachment of the OTH battery 902 for the communication apparatus 901.

If it is determined in S301 that the communication apparatus 901 has a setting enabling a print request, the processing moves to S302. In S302, the communication apparatus 901 scans the advertising packet from the peripheral apparatus in the OTH wireless communication unit A 912.

If it is determined in S301 that the communication apparatus 901 does not have a setting enabling a print request, the flowchart in FIG. 3 ends.

In S303, the communication apparatus 901 determines whether the advertising packet scanned in S302 includes one of UUID 1 to UUID 5 for identifying Service 1 through Service 5.

It is assumed that the advertising packet determined in S303 is an advertising packet as illustrated in one of FIGS. 5A to 5E including, within data in the advertising packet, a UUID for identifying a Service as in the following list.
Service 1 (PRINT_OK): UUID 1
Service 2 (NO_INK): UUID 2
Service 3 (NO_PAPER): UUID 3
Service 4 (NO_INK_NO_PAPER): UUID 4
Service 5 (UNMATCH_SIZE): UUID 5

If the communication apparatus 901 in S303 determines that the advertising packet includes one of UUID 1 to UUID 5 for identifying Service 1 to Service 5, the processing moves to S304.

If the communication apparatus 901 in S303 determines that the advertising packet does not include one of UUID 1 to UUID 5 for identifying Service 1 to Service 5, the processing moves to S306.

The communication apparatus 901 in S304 determines whether the print service availability status of the printing apparatus 701 is "NORMAL PRINT OK" from UUID corresponding to the Service in the advertising packet scanned in S303.

The determination in S304 determines the print service availability status of the printing apparatus 701 is "NORMAL PRINT OK" if the advertising packet scanned in S302 includes UUID 1 for identifying the Service 1.

If the advertising packet scanned in S302 includes one of UUID 2 to UUID 5 for identifying Service 2 to Service 5, the print service availability status of the printing apparatus 701 is not "NORMAL PRINT OK".

If the communication apparatus 901 determines that the print service availability status of the printing apparatus 701 is not "NORMAL PRINT OK", the communication apparatus 901 in S305 stores a print service availability status error of the printing apparatus 701. The processing then returns to S302.

If the communication apparatus 901 in S304 determines that the print service availability status of the printing apparatus 701 is "NORMAL PRINT OK", the communication apparatus 901 in S306 determines whether an operation for executing a print request service has been performed in response to an operation performed on the OTH operation input unit 911 by a user.

If the communication apparatus 901 in S306 determines that an operation for executing a print request service has not been performed in response to an operation performed on the OTH operation input unit 911 by a user, the processing returns to S301.

If the communication apparatus 901 in S306 determines that an operation for executing a print request service has been performed in response to an operation performed on the OTH operation input unit 911 by a user, the processing moves to S307. In S307, the communication apparatus 901 determines whether the print service availability status error of the printing apparatus 701 is not stored.

The determination in S307 determines that the error is stored if the communication apparatus 901 in S305 stores the print service availability status error of the printing apparatus 701 and, if not, determines that the error is not stored.

If the communication apparatus 901 in S307 determines that the print service availability status error of the printing apparatus 701 is stored, the communication apparatus 901 in S308 displays on the OTH display unit 908 error information describing that the print service of the printing apparatus 701 is disabled. The processing then returns to S302.

The content to be displayed on the OTH display unit 908 by the communication apparatus 901 in S308 may be detail illustration of the print service availability status of the printing apparatus 701 based on information regarding one of combination examples (B) to (E) of the print service availability status and the notification information in FIG. 4.

If the communication apparatus 901 in S307 determines that the print service availability status error of the printing apparatus 701 is not stored, the communication apparatus 901 in S309 scans an advertising packet from a peripheral apparatus in the OTH wireless communication unit A 912.

Not illustrated in the flowchart in FIG. 3, if the communication apparatus 801 determines that the print service availability status error of the printing apparatus 701 is not stored, content indicating that the print service availability status is "YES" may be displayed on the OTH display unit 908.

In S310, the communication apparatus 901 determines whether the advertising packet scanned in S309 includes UUID 1 for identifying Service 1.

It is assumed that the advertising packet determined in S303 is an advertising packet as illustrated in FIG. 5A including, within data in the advertising packet, a UUID for identifying the following Service.
Service 1 (PRINT_OK): UUID 1

If the communication apparatus 901 in S310 determines that the advertising packet includes UUID 1 for identifying Service 1, the processing moves to S322.

The communication apparatus 901 in S310 determines that the advertising packet does not include UUID 1 for identifying Service 1, the processing returns to S301.

In S322, the communication apparatus 901 determines whether the normalization field intensity of the peripheral apparatus having transmitted the advertising packet including UUID 1 for identifying Service 1 is equal to or higher than a threshold value.

The determination regarding the normalization field intensity in S322 applies a numerical value of the transmission power (TxPowerLevel) set by the peripheral apparatus and included in the flag (Flag 6), as in the data example in the advertising packet in FIG. 5A.

For example, the normalization field intensity L7 can be expressed as $L7=L7B-L7A$ [dB] where the transmission power numerical value is L7A [dB], and the reception signal intensity of the advertising packet received by the OTH wireless communication unit A 912 in the communication apparatus 901 is L7B [dB].

If the communication apparatus 901 in S322 determines that the normalization field intensity L7 is not equal to or higher than a threshold value Lt7, the processing returns to S301.

If the communication apparatus 901 in S322 determines that the normalization field intensity L7 is equal to or higher than the threshold value Lt7, the processing moves to S323.

In S323, the communication apparatus 901 transmits a connection request to the peripheral apparatus transmitting the advertising packet including UUID 1. In S324, a Bluetooth® Low Energy communication link is established.

The communication apparatus 901 in S325 performs WLAN handover with the apparatus to which the Bluetooth® Low Energy communication link has been established. The term "WLAN handover" specifically refers to sharing of an SSID and connection password information in a Bluetooth® Low Energy communication of the OTH wireless communication unit A 912 and establishment of a WLAN communication link with an apparatus establishing the Bluetooth® Low Energy communication link by using the OTH wireless communication unit B 922.

The communication apparatus 901 in S326 transmits data to the apparatus establishing the WLAN communication link in the OTH wireless communication unit B 922, and the printing apparatus 701 performs a print service in the PTR printing unit 710. The communication apparatus 901 then terminates the WLAN communication link, and the processing moves to S327.

The communication apparatus 901 in S327 terminates the Bluetooth® Low Energy communication link, and the flowchart in FIG. 3 ends.

In the flowchart in FIG. 3, the processing from S302 to S304 and from S302 to S305 through S304 is performed inside a communicable range of the wireless communication unit A and outside a print start range of the wireless communication unit A in the apparatus layout example illustrated in FIG. 10.

Referring to the apparatus layout example in FIG. 10, the expression "inside a communicable range of the wireless communication unit A" refers to a range where a Bluetooth® Low Energy communication link is established between the PTR wireless communication unit A 712 and the OTH wireless communication unit A 912 so that they are communicable.

Referring to the apparatus layout example illustrated in FIG. 10, the expression "print start range of the wireless communication unit A" refers to a range where a Bluetooth® Low Energy communication link is established between the PTR wireless communication unit A 712 and the OTH wireless communication unit A 912 so that they are communicable and where the normalization field intensity L7 as described above is equal to or higher than the threshold value Lt7.

Figure 11A:
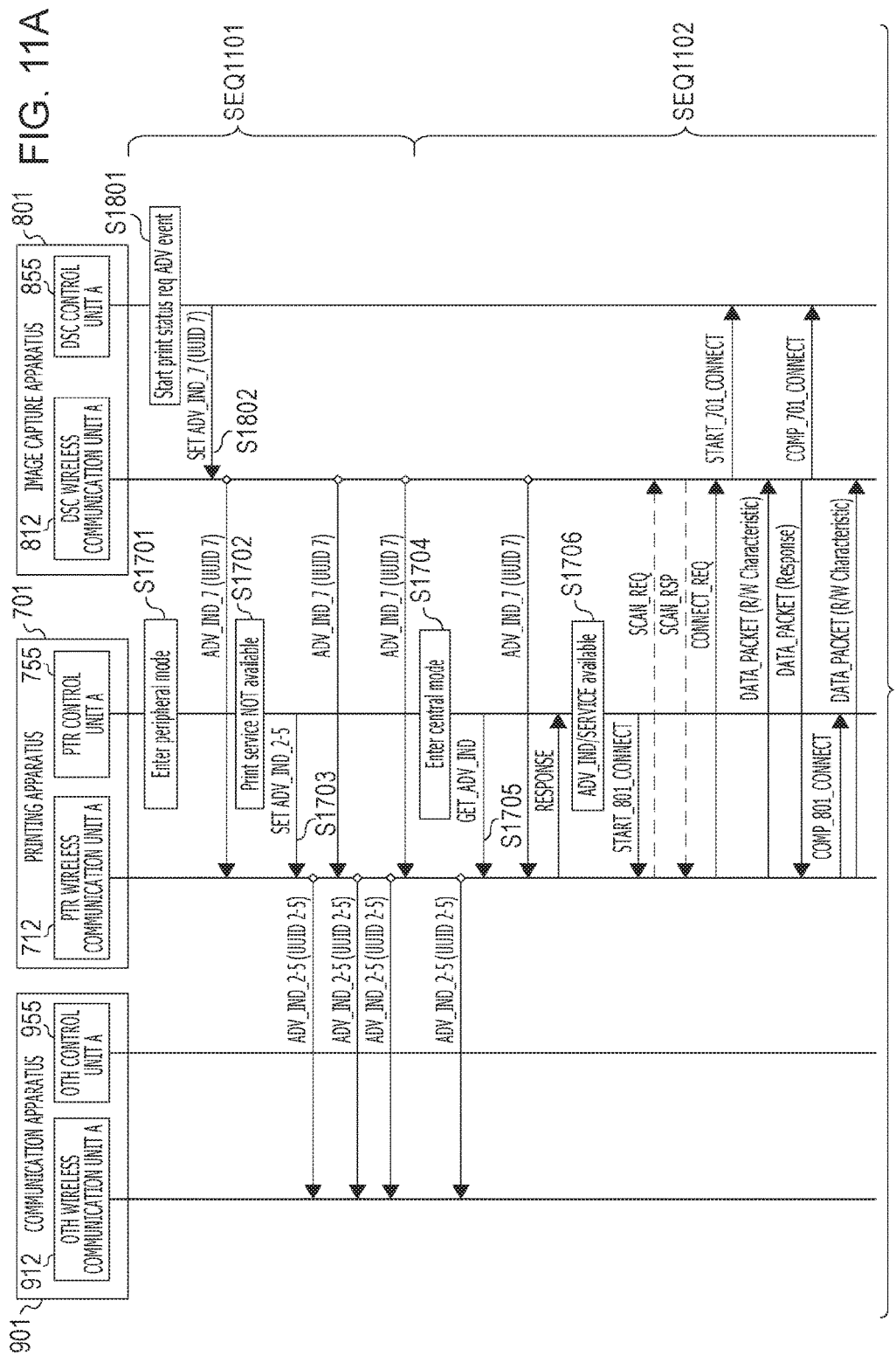
FIG. 11A is a sequence diagram illustrating a procedure for notification of a print service availability status between the printing apparatus and the image capture apparatus according to the first embodiment.
Figure 12C:
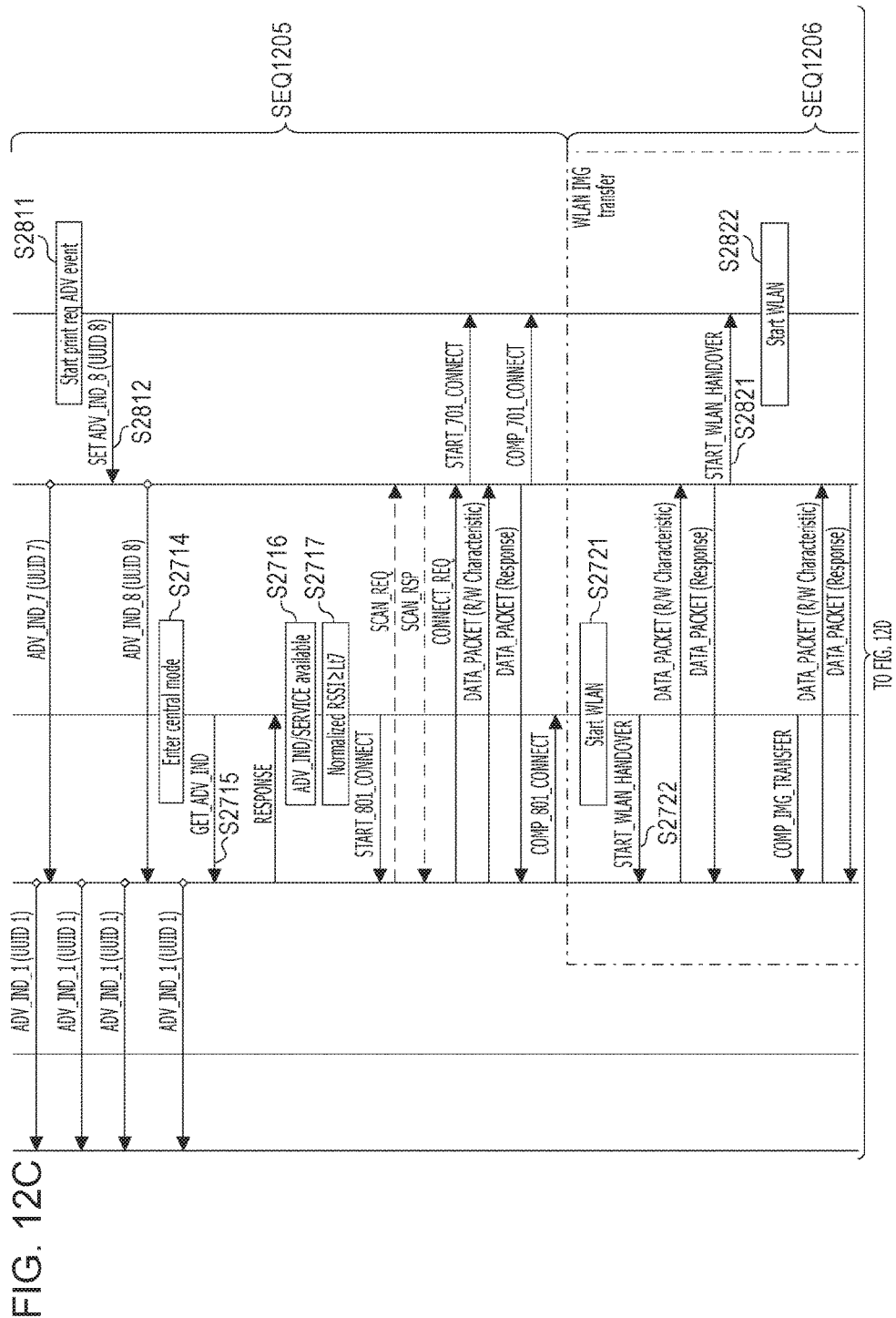
FIG. 12C is a sequence diagram illustrating the procedure for notification of a print service availability status and execution of a print service between the printing apparatus and the image capture apparatus according to the first embodiment.
Figure 12D:
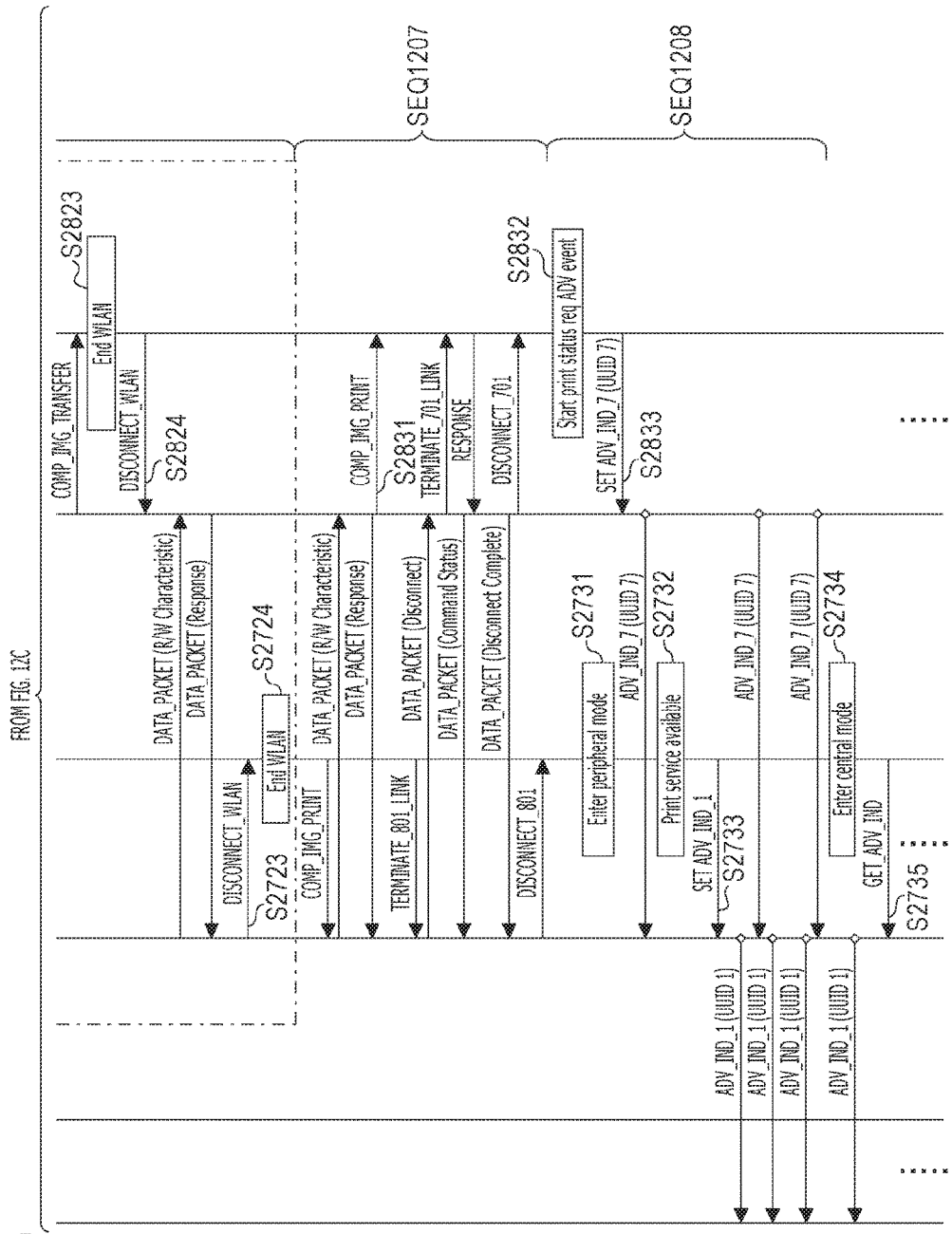
FIG. 12D is a sequence diagram illustrating the procedure for notification of a print service availability status and execution of a print service between the printing apparatus and the image capture apparatus according to the first embodiment.

With reference to FIGS. 11A and 11B, a sequence will be described implementing a procedure for performing notification of a print service availability status between the printing apparatus 701 and the image capture apparatus 801 while the printing apparatus 701 and the image capture apparatus 801 are executing the flowcharts in FIGS. 1 and 2.

The sequences in FIGS. 11A and 11B according to this embodiment will be described for the purpose of description of a distinctive sequence according to this embodiment, and descriptions of sequences for general Bluetooth® Low Energy communication will be omitted.

Upon start of the sequence illustrated in FIGS. 11A and 11B, the printing apparatus 701 and the image capture apparatus 801 are positioned in a communicable range of the wireless communication unit A, as illustrated in the layout example in FIG. 10. The following description assumes that the positions of the printing apparatus 701 and the image capture apparatus 801 then move to a print start range of the wireless communication unit A.

SEQ 1101: The DSC control unit A 855 in the image capture apparatus 801 generates a print status request event in S1801 and transmits a SET_ADV_IND7 command to the DSC wireless communication unit A 812 S1802.

The DSC wireless communication unit A 812 in the image capture apparatus 801 transmits an advertising packet ADV_IND_7 including UUID 7. After that, the transmission of an advertising packet is performed at predetermined time intervals.

In S1701, the printing apparatus 701 sets its role setting to a peripheral role.

In S1702, the PTR control unit A 755 in the printing apparatus 701 confirms that the print service availability status of the PTR printing unit 710 is "NO".

In S1703, the PTR control unit A 755 in the printing apparatus 701 transmits, to the PTR wireless communication unit A 712, one of commands from SET_ADV_IND2 to SET_ADV_IND5.

The PTR wireless communication unit A 712 in the printing apparatus 701 transmits one of advertising packets ADV_IND_2 to ADV_IND_5 including one of UUID 2 to UUID 5. After that, the transmission of an advertising packet is performed at predetermined time intervals.

SEQ 1102: In S1704, the printing apparatus 701 sets its role setting to a central role.

In S1705, the PTR control unit A 755 in the printing apparatus 701 in response to a GET_ADV_IND command scans the advertising packet by using the PTR wireless communication unit A 712.

The PTR wireless communication unit A 712 in the printing apparatus 701 returns a result of the scanning as RESPONSE to the PTR control unit A 755.

In S1706, the PTR control unit A 755 in the printing apparatus 701 acquires a value in the advertising packet and confirms that the advertising packet includes UUID 7 for identifying Service 7 (PRINT_STATUS_REQ) from the image capture apparatus 801.

The PTR control unit A 755 in the printing apparatus 701 transmits a START_801_CONNECT command to the PTR wireless communication unit A 712. Then, the establishment of a Bluetooth® Low Energy communication link starts between the PTR wireless communication unit A 712 in the printing apparatus 701 and the DSC wireless communication unit A 812 in the image capture apparatus 801.

Here, the Bluetooth® Low Energy communication link is established between the printing apparatus 701 being a Bluetooth® Low Energy central role apparatus and the image capture apparatus 801 being a Bluetooth® Low Energy peripheral role apparatus.

The establishment of the Bluetooth® Low Energy communication link between the PTR wireless communication unit A 712 in the printing apparatus 701 and the DSC wireless communication unit A 812 in the image capture apparatus 801 ends. Then, the PTR wireless communication unit A 712 notifies the PTR control unit A 755 of the establishment of the Bluetooth® Low Energy communication link by using a COMP_801_CONNECT command. The DSC wireless communication unit A 812 notifies the DSC control unit A 855 of establishment of a Bluetooth® Low Energy communication rink by using a COMP_701_CONNECT command.

The PTR wireless communication unit A 712 in the printing apparatus 701 exchanges DATA_PACKET with the DSC wireless communication unit A 812 in the image capture apparatus 801 and notifies the image capture apparatus 801 of that the print service availability status of the PTR printing unit 710 is "NO".

In S1803, the DSC wireless communication unit A 812 in the image capture apparatus 801 having notified that the print service availability status is "NO" notifies the error status disabling the print service to the DSC control unit A 855.

The PTR control unit A 755 transmits a TERMINATE_801_LINK command to the PTR wireless communication unit A 712 so that the Bluetooth® Low Energy communication link is started to be cancelled between the PTR wireless communication unit A 712 in the printing apparatus 701 and the DSC wireless communication unit A 812 in the image capture apparatus 801.

The cancelling of the Bluetooth® Low Energy communication link completes between the PTR wireless communication unit A 712 in the PTR apparatus 701 and the DSC wireless communication unit A 812 in the image capture apparatus 801. The PTR wireless communication unit A 712 then notifies the cancelling of the Bluetooth® Low Energy communication link to the PTR control unit A 755 by using a DISCONNECT_801 command. The DSC wireless communication unit A 812 notifies the cancelling of the Bluetooth® Low Energy communication link to the DSC control unit A 855 by using a DISCONNECT 701 command.

SEQ 1103: Because the processing from S1804 to S1805 in the image capture apparatus 801 and the processing from S1707 to S1709 in the printing apparatus 701 are the same as the processing in SEQ 1101, any repetitive descriptions will be omitted.

In S1806, the DSC control unit A 855 in the image capture apparatus 801 confirms that execution of a print request service is instructed by an operation performed on the DSC operation input unit 811.

Because the DSC control unit A 855 in the image capture apparatus 801 has obtained the error status disabling the print service in S1803, the image capture apparatus 801 in S1807 displays, on the DSC display unit 808, error information indicating that the print, service is disabled in the printing apparatus 701.

After this, even when the positions of the printing apparatus 701 and the image capture apparatus 801 move to the print start range of the wireless communication unit A, the printing apparatus 701 has notified the error status disabling the print service to the image capture apparatus 801. Thus, the print service is not started which triggers detection of an approach based on a radio wave intensity.

By returning from SEQ 1103 to SEQ 1101, the notification of a print service availability status can be performed again. The sequence in FIGS. 11A and 11B has been described up to this point.

Next, with reference to FIGS. 12A to 12D, a sequence will be described for a procedure which performs notification of a print service availability status and execution of a print service between the printing apparatus 701 and the image capture apparatus 801 while the printing apparatus 701 is executing the flowchart in FIGS. 1 and 2. FIGS. 12A to 12D illustrate sequence divisions of a continuous sequence.

The printing apparatus 701 and the image capture apparatus 801 are positioned in the communicable range of the wireless communication unit A upon start of the sequence in FIGS. 12A to 12D, as illustrated in the layout example in FIG. 10. The following description assumes that the positions of the printing apparatus 701 and the image capture apparatus 801 then move to the print start range of the wireless communication unit A.

SEQ 1201: The DSC control unit A 855 in the image capture apparatus 801 generates a print status request event in S2801 and transmits a SET_ADV_IND7 command to the DSC wireless communication unit A 812 in S2802.

The DSC wireless communication unit A 812 in the image capture apparatus 801 transmits an advertising packet ADV_IND_7 including UUID 7. After that, the transmission of an advertising packet is performed at predetermined time intervals.

In S2701, the printing apparatus 701 sets its role setting to a peripheral role.

In S2702, the PTR control unit A 755 in the printing apparatus 701 confirms that the print service availability status of the PTR printing unit 710 is "YES".

In S2703, the PTR control unit A 755 in the printing apparatus 701 transmits a SET_ADV_IND1 command to the PTR wireless communication unit A 712.

The FIR wireless communication unit A 712 in the printing apparatus 701 transmits an advertising packet ADV_IND_1 including UUID 1. After that, the transmission of an advertising packet is performed at predetermined time intervals.

SEQ 1202: In S2704, the printing apparatus 701 sets its role setting to a central role.

In S2705, the PTR control unit A 755 in the printing apparatus 701 in response to a GET_ADV_IND command scans the advertising packet by using the PTR wireless communication unit A 712.

The PTR wireless communication unit A 712 in the printing apparatus 701 returns a result of the scanning as RESPONSE to the PTR control unit A 755.

In S2706, the PTR control unit A 755 in the printing apparatus 701 acquires a value in the advertising packet and confirms that the advertising packet includes UUID 7 for identifying Service 7 (PRINT_STATUS_REQ) from the image capture apparatus 801.

The PTR control unit A 755 in the printing apparatus 701 transmits a START_801_CONNECT command to the PTR wireless communication unit A 712. Then, the establishment of a Bluetooth® Low Energy communication link between the PTR wireless communication unit A 712 in the printing apparatus 701 and the DSC wireless communication unit A 812 in the image capture apparatus 801 starts.

Here, the Bluetooth® Low Energy communication link is established between the printing apparatus 701 being a Bluetooth® Low Energy central role apparatus and the image capture apparatus 801 being a Bluetooth® Low Energy peripheral role apparatus.

The establishment of the Bluetooth® Low Energy communication link between the PTR wireless communication unit A 712 in the printing apparatus 701 and the DSC wireless communication unit A 812 in the image capture apparatus 801 ends. Then, the PTR wireless communication unit A 712 notifies the PTR control unit A 755 of the establishment of the Bluetooth® Low Energy communication link by using the COMP_801_CONNECT command. The DSC wireless communication unit A 812 notifies the DSC control unit A 855 of establishment of a Bluetooth® Low Energy communication link by using a COMP_701_CONNECT command.

The PTR wireless communication unit A 712 in the printing apparatus 701 exchanges DATA_PACKET with the DSC wireless communication unit A 812 in the image capture apparatus 801 and notes the image capture apparatus 801 of that the print service availability status of the PTR printing unit 710 is "YES".

In S2803, the DSC wireless communication unit A 812 in the image capture apparatus 801 having notified that the print service availability status is "YES" notifies the print service availability status is not an error status disabling the print service to the DSC control unit A 855.

The PTR control unit A 755 transmits a TERMINATE_801_LINK command to the PTR wireless communication unit A 712 so that the Bluetooth® Low Energy communication link is started to be cancelled between the PTR wireless communication unit A 712 in the printing apparatus 701 and the DSC wireless communication unit A 812 in the image capture apparatus 801.

The cancelling of the Bluetooth® Low Energy communication link completes between the PTR wireless communication unit A 712 in the PTR apparatus 701 and the DSC wireless communication unit A 812 in the image capture apparatus 801. The PTR wireless communication unit A 712 then notifies the cancelling of the Bluetooth® Low Energy communication link to the PTR control unit A 755 by using a DISCONNECT_801 command. The DSC wireless communication unit A 812 notifies the cancelling of the Bluetooth® Low Energy communication link to the DSC control unit A 855 by using a DISCONNECT_701 command.

SEQ 1203: Because the processing from S2804 to S2805 in the image capture apparatus 801 and the processing from S2707 to S2709 in the printing apparatus 701 are the same as the processing in SEQ 1201, any repetitive descriptions will be omitted.

In S2806, the DSC control unit A 855 in the image capture apparatus 801 confirms that execution of a print request service is instructed by an operation performed on the DSC operation input unit 811.

Because the DSC control unit A 855 in the image capture apparatus 801 has obtained that the print service availability status is not an error status disabling the print service in S2803, the DSC control unit A 855 in the image capture apparatus 801 generates a print request event in S2807. In S2808, a SET_ADV_IND8 command is transmitted to the DSC wireless communication unit A 812.

The DSC wireless communication unit A 812 in the image capture apparatus 801 transmits an advertising packet ADV_IND_8 including UUID 8. After that, the transmission of an advertising packet is performed at predetermined time intervals.

After this, when the positions of the printing apparatus 701 and the image capture apparatus 801 move to the print start range of the wireless communication unit A, the printing apparatus 701 has notified that the print service availability status is not the error status disabling the print service to the image capture apparatus 801. Thus, the print service is started which triggers detection of an approach based on a radio wave intensity.

SEQ 1204: In S2710, the printing apparatus 701 sets its role setting to a central role.

In S2711, the PTR control unit A 755 in the printing apparatus 701 in response to a GET_ADV_IND command scans the advertising packet by using the PTR wireless communication unit A 712.

The PTR wireless communication unit A 712 in the printing apparatus 701 returns a result of the scanning as RESPONSE to the PTR control unit A 755.

In S2712, the PTR control unit A 755 in the printing apparatus 701 acquires a value in the advertising packet and confirms that the advertising packet includes UUID 8 for identifying Service 8 (PRINT_REQ) from the image capture apparatus 801.

In S2713, the printing apparatus 701 confirms that the normalization field intensity of the image capture apparatus 801 having transmitted the advertising packet is not equal to or higher than a threshold value based on a numerical value of the transmission power (TxPowerLevel) of the flag (Flag 6) included in the advertising packet.

The printing apparatus 701 does not start the print service if the normalization field intensity is not equal to or higher than the threshold value even when the advertising packet includes UUID 8 for identifying Service 8 (PRINT_REQ).

If the image capture apparatus 801 having started to transmit the advertising packet ADV_IND_8 including UUID 8 in response to the command in S2808 does not receive a connection request within a predefined time period, the DSC control unit A 855 in the image capture apparatus 801 generates a print status request event in S2809.

In S2810, the image capture apparatus 801 transmits a SET_ADV_IND7 command to the DSC wireless communication unit A 812.

The DSC wireless communication unit A 812 in the image capture apparatus 801 transmits an advertising packet ADV_IND_7 including UUID 7. After that, the transmission of an advertising packet is performed at predetermined time intervals.

Here, the image capture apparatus 801 having started to transmit the advertising packet ADV_IND_8 including UUID 8 operates to stop the transmission of ADV_IND_8 as a result.

SEQ 1205: The DSC control unit A 855 in the image capture apparatus 801 has confirmed that the operation performed on the DSC operation input unit 811 instructs execution of the print request service in S2806 and has not execute the print service yet.

If the image capture apparatus 801 having started to transmit the advertising packet ADV_IND_7 including UUID 7 in response to the command in S2810 does not receive a connection request within a predefined time period, the DSC control unit A 855 in the image capture apparatus 801 generates a print request event in S2811.

In S2812, the image capture apparatus 801 transmits a SET_ADV_IND8 command to the DSC wireless communication unit A 812.

The DSC wireless communication unit A 812 in the image capture apparatus 801 transmits an advertising packet ADV_IND_8 including QUID 8. After that, the transmission of an advertising packet is performed at predetermined time intervals.

Here, the image capture apparatus 801 having started to transmit the advertising packet ADV_IND_7 including UUID 7 operates to stop the transmission of ADV_IND_7 as a result.

In S2714, the printing apparatus 701 sets its role setting to a central role.

In S2715, the PTR control unit A 755 in the printing apparatus 701 in response to a GET_ADV_IND command scans the advertising packet by using the PTR wireless communication unit A 712.

The PTR wireless communication unit A 712 in the printing apparatus 701 returns a result of the scanning as RESPONSE to the PTR control unit A 755.

In S2716, the PTR control unit A 755 in the printing apparatus 701 acquires a value in the advertising packet and confirms that the advertising packet includes UUID 8 for identifying Service 8 (PRINT_REQ) from the image capture apparatus 801.

In S2717, the printing apparatus 701 confirms that the normalization field intensity of the image capture apparatus 801 having transmitted the advertising packet is equal to or higher than a threshold value based on a numerical value of the transmission power (TxPowerLevel) of the flag (Flag 6) included in the advertising packet.

The printing apparatus 701 starts the print service if the normalization field intensity is equal to or higher than the threshold value when the advertising packet includes QUID 8 for identifying Service 8 (PRINT_REQ).

The printing apparatus 701 establishes a Bluetooth® Low Energy communication link between the PTR wireless communication unit A 712 in the printing apparatus 701 and the DSC wireless communication unit A 812 in the image capture apparatus 801.

SEQ 1206: In S2721, the printing apparatus 701 generates a Start WLAN event and turns on the PTR wireless communication unit B 722. The establishment of a WLAN communication link then starts between the PTR wireless communication unit B 722 in the printing apparatus 701 and the DSC wireless communication unit B 822 in the image capture apparatus 801.

In S2722, the PTR control unit A 755 in the printing apparatus 701 notifies the start of the WLAN communication link to the PTR wireless communication unit A 712 by using a START_WLAN_HANDOVER command.

In S2821, the DSC wireless communication unit A 812 in the image capture apparatus 801 transmits a START_WLAN_HANDOVER command to the DSC control unit A 855.

In S2822, the DSC control unit A 855 generates a Start WLAN event and turns on the DSC wireless communication unit B 822. Then, the WLAN communication link is established between the PTR wireless communication unit B 722 in the printing apparatus 701 and the DSC wireless communication unit B 822 in the image capture apparatus 801.

Here, the PTR wireless communication unit B 722 in the printing apparatus 701 and the DSC wireless communication unit B 822 in the image capture apparatus 801 can exchange data over the WLAN as a result of the establishment of the WLAN communication link.

The image capture apparatus 801 transmits image data to be printed by using the DSC wireless communication unit B 822, and the PTR wireless communication unit B 722 in the printing apparatus 701 receives the image data to be printed.

After the transmission and reception of the image data to be printed are completed, the DSC control unit A 855 in the image capture apparatus 801 generates an End WLAN event in S2823. The WLAN communication link between the DSC wireless communication unit B 822 and the PTR wireless communication unit B 722 is cancelled, and the DSC wireless communication unit B 822 is turned off.

In S2824 then, the DSC control unit A 855 transmits a DISCONNECT_WLAN command to the DSC wireless communication unit A 812.

In S2723, the PTR wireless communication unit A 712 in the printing apparatus 701 transmits a DISCONNECT_W-LAN command to the PTR control unit A 755.

In S2724, the PTR control unit A 755 in the printing apparatus 701 generates an End WLAN event, and the PTR wireless communication unit B 722 is turned off.

SEQ 1207: in S2831, the DSC wireless communication unit A 812 in the image capture apparatus 801 transmits a COMP_IMG_PRINT command indicating that the print service has been completed to the DSC control unit A 855.

The PTR control unit A 755 transmits a TERMINATE_801_LINK command to the PTR wireless communication unit A 712, and the cancelling of the Bluetooth® Low Energy communication link is started between the PTR wireless communication unit A 712 in the printing apparatus 701 and the DSC wireless communication unit A 812 in the image capture apparatus 801.

The cancelling of the Bluetooth® Low Energy communication link completes between the PTR wireless communication unit A 712 in the PTR apparatus 701 and the DSC wireless communication unit A 812 in the image capture apparatus 801. Then, the PTR wireless communication unit A 712 notifies the cancelling of the Bluetooth® Low Energy communication link to the PTR control unit A 755 by using a DISCONNECT_801 command. The DSC wireless communication unit A 812 notifies the cancelling of the Bluetooth® Low Energy communication link to the DSC control unit A 855 by using a DISCONNECT_701 command.

SEQ 1208: Because the processing from S2731 to S2733 in the printing apparatus 701 and the processing from S2832 to S2833 in the image capture apparatus 801 are the same as the processing in SEQ 1201, any repetitive descriptions will be omitted. Because the processing from S2734 to S2735 in the printing apparatus 701 is the same as the processing in the first half of SEQ 1201, any repetitive descriptions will be omitted.

Returning from SEQ 1208 to SEQ 1201, notification of a print service availability status and execution of a print service can be performed again. The sequence in FIGS. 12A to 12D has been described up to this point.

Next, with reference to FIGS. 13A and 13B, a sequence will be described implementing a procedure for performing notification of a print service availability status between the printing apparatus 701 and the communication apparatus 901 while the printing apparatus 701 and the communication apparatus 901 are executing the flowcharts in FIGS. 1 and 3.

Figure 13B:
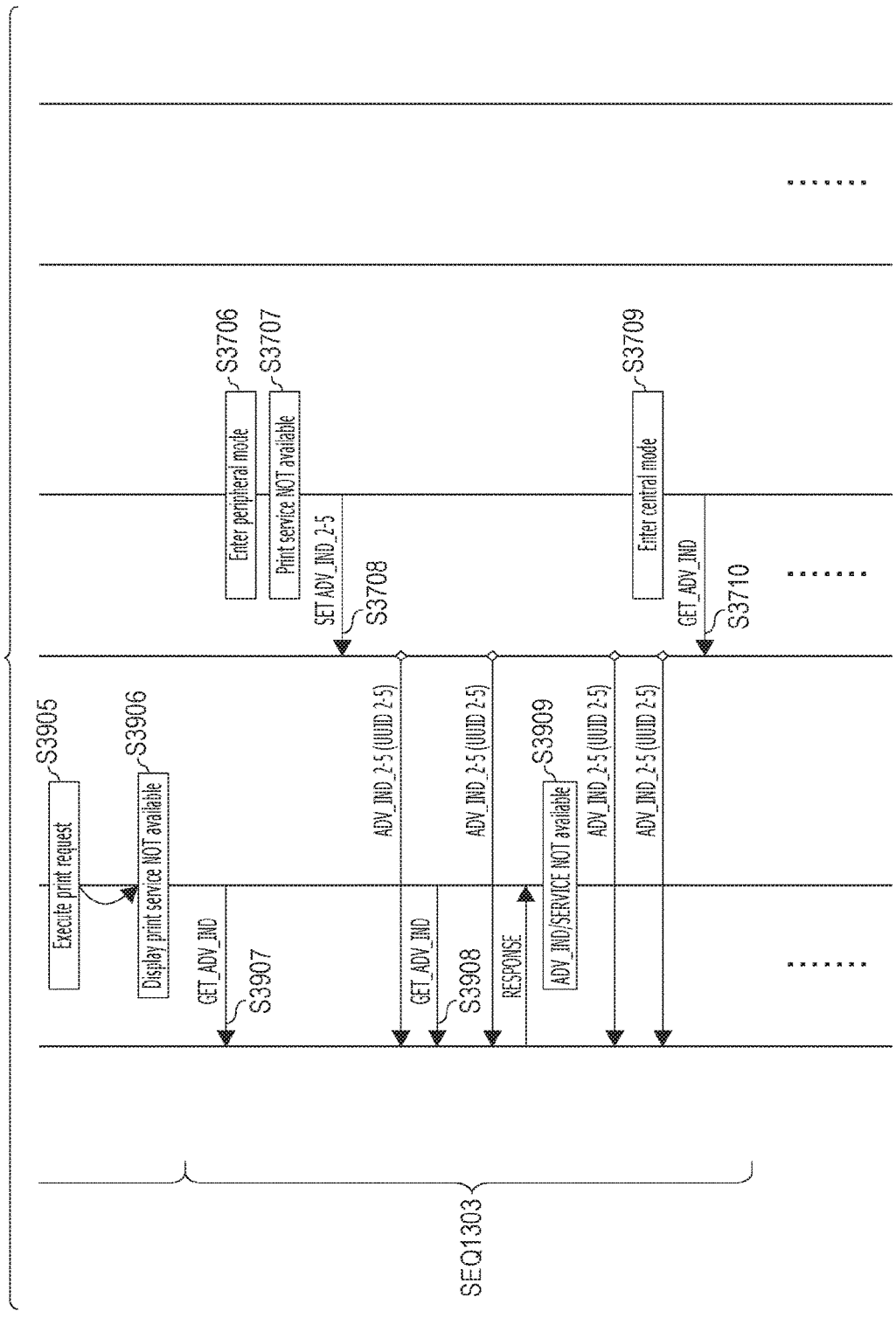
FIG. 13B is a sequence diagram illustrating the procedure for notification of a print service availability status between the printing apparatus and the communication apparatus according to the first embodiment.
Figure 14B:
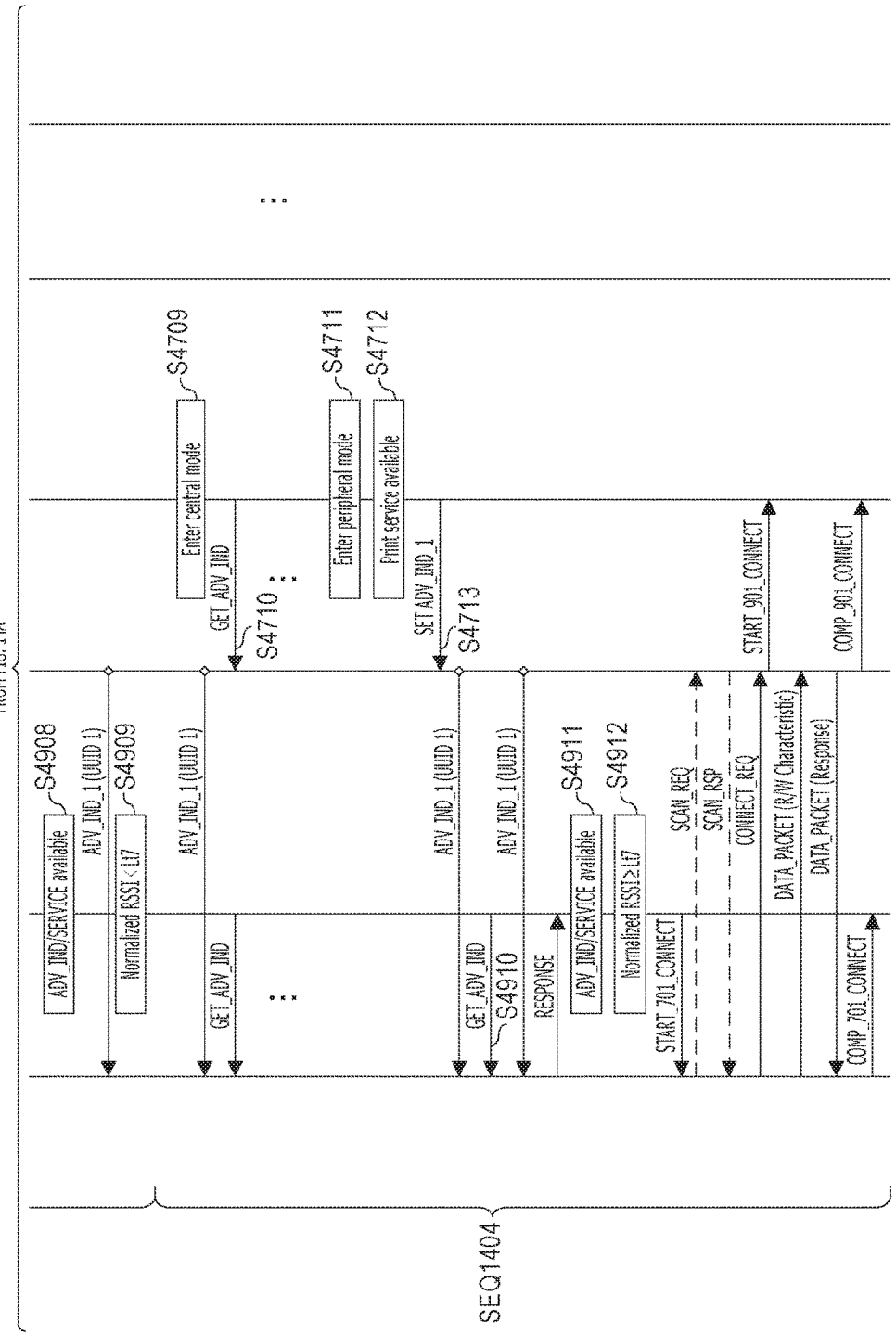
FIG. 14B is a sequence diagram illustrating the procedure for notification of a print service availability status and execution of a print service between the printing apparatus and the communication apparatus according to the first embodiment.

Upon start of the sequence illustrated in FIGS. 13A and 13B, the printing apparatus 701 and the communication apparatus 901 are positioned in a communicable range of the wireless communication unit A, as illustrated in the layout example in FIG. 10. The following description assumes that the positions of the printing apparatus 701 and the communication apparatus 901 then move to a print start range of the wireless communication unit A.

SEQ 1301: in S3701, the printing apparatus 701 sets its role setting to a peripheral role.

In S3702, the PTR control unit A 755 in the printing apparatus 701 confirms that the print service availability status of the PTR printing unit 710 is "NO".

In S3703, the PTR control unit A 755 in the printing apparatus 701 transmits, to the PTR wireless communication unit A 712, one of commands from SET_ADV_IND2 to SET_ADV_IND5.

The PTR wireless communication unit A 712 in the printing apparatus 701 transmits one of advertising packets ADV_IND_2 to ADV_IND_5 including one of UUID 2 to UUID 5. After that the transmission of an advertising packet is performed at predetermined time intervals.

In S3901, the OTH control unit A 955 in the communication apparatus 901 generates a print status acquisition event.

In S3902, the OTH control unit A 955 in the communication apparatus 901 in response to a GET_ADV_IND command scans an advertising packet by using the OTH wireless communication unit A 912.

Referring to the sequence example in FIGS. 13A and 13B, it is assumed that an advertising packet from a peripheral apparatus does not exist. Thus, the scanning results in "no advertising packet".

In S3905, the OTH control unit A 955 in the communication apparatus 901 in response to a GET_ADV_IND command scans the advertising packet by using the OTH wireless communication unit A 912.

The OTH wireless communication unit A 912 in the communication apparatus 901 returns the result of the scanning as RESPONSE to the OTH control unit A 955.

In S3904, the OTH control unit A 955 in the communication apparatus 901 acquires a value in the advertising packet and confirms that the advertising packet includes one of UUID 2 to UUID 5 from the printing apparatus 701.

If one of UUID 2 to UUID 5 exists within data in the advertising packet, the OTH control unit A955 in the communication apparatus 901 checks that the print service availability status of the PTR printing unit 710 in the printing apparatus 701 is "NO".

SEQ 1302: in S3704, the printing apparatus 701 sets its role setting to a central role.

In S3705, the PTR control unit A 755 in the printing apparatus 701 in response to a GET_ADV_IND command scans the advertising packet by using the PTR wireless communication unit A 712.

Referring to the sequence example in FIGS. 13A and 13B, it is assumed that an advertising packet from a peripheral apparatus does not exist. Thus, the scanning results in "no advertising packet".

In S3905, the OTH control unit A 955 in the communication apparatus 901 confirms that execution of a print request service is instructed by an operation performed on the OTH operation input unit 911.

Because the OTH control unit A 955 in the communication apparatus 901 has obtained the error status disabling the print service in S3904, the communication apparatus 901 in S3906 displays, on the OTH display unit 908, error information indicating that the print service is disabled in the printing apparatus 701.

After this, even when the positions of the printing apparatus 701 and the communication apparatus 901 move to the print start range of the wireless communication unit A, the printing apparatus 701 has notified the error status disabling the print service to the communication apparatus 901. Thus, the print service is not started which triggers detection of an approach based on a radio wave intensity.

SEQ 1303: Because the processing from S3706 to S3708 in the printing apparatus 701 and the processing from S3907 to S3909 in the communication apparatus 901 are the same as the processing in SEQ 1301, any repetitive descriptions will be omitted. Because the processing from S3709 to S3710 in the printing apparatus 701 is the same as the first half of SEQ 1302, any repetitive descriptions will be omitted.

By returning from SEQ 1303 to SEQ 1301, the notification of a print service availability status can be performed again. The sequence in FIGS. 13A and 13B has been described up to this point.

Next, with reference to FIGS. 14A to 14D, a sequence will be described for a procedure which performs notification of a print service availability status and execution of a print service between the printing apparatus 701 and the communication apparatus 901 while the printing apparatus 701 and the communication apparatus 901 are executing the flowchart in FIGS. 1 and 3 is being executed. FIGS. 14A to 14D illustrate sequence divisions of a continuous sequence.

The printing apparatus 701 and the communication apparatus 901 are positioned in the communicable range of the wireless communication unit A upon start of the sequence in FIGS. 14A to 14D, as illustrated in the layout example in FIG. 10. The following description assumes that the positions of the printing apparatus 701 and the communication apparatus 901 then move to the print start range of the wireless communication unit A.

SEQ 1401: In S4701, the printing apparatus 701 sets its role setting to a peripheral role.

In S4702, the PTR control unit A 755 in the printing apparatus 701 confirms that the print service availability status of the PTR printing unit 710 is "YES".

In S4703, the PTR control unit A 755 in the printing apparatus 701 transmits a SET_ADV_IND1 command to the PTR wireless communication unit A 712.

The PTR wireless communication unit A 712 in the printing apparatus 701 transmits an advertising packet ADV_IND_1 including UUID 1. After that, the transmission of an advertising packet is performed at predetermined time intervals.

In S4901, the OTH control unit A 955 in the communication apparatus 901 generates a print status acquisition event.

In S4902, the OTH control unit A 955 in the communication apparatus 901 in response to a GET_ADV_IND command scans an advertising packet by using the OTH wireless communication unit A 912.

Referring to the sequence example in FIGS. 14A to 140, it is assumed that an advertising packet from a peripheral apparatus does not exist. Thus, the scanning results in "no advertising packet".

In S4903, the OTH control unit A 955 in the communication apparatus 901 in response to a GET_ADV_IND command scans the advertising packet by using the OTH wireless communication unit A 912.

The OTH wireless communication unit A 912 in the communication apparatus 901 returns a result of the scanning as RESPONSE to the OTH control unit A 955.

In S4904, the OTH control unit A 955 in the communication apparatus 901 acquires a value of the advertising packet and confirms that the advertising packet includes UUID 1 from the printing apparatus 701.

If data within the advertising packet has UUID 1, the OTH control unit A 955 in the communication apparatus 901 confirms that the print service availability status of the PTR printing unit 710 in the printing apparatus 701 is "YES".

SEQ 1402: In S4704, the printing apparatus 701 sets its role setting to a central role.

In S4705, the PTR control unit A 755 in the printing apparatus 701 in response to a GET_ADV_IND command scans the advertising packet by using the PTR wireless communication unit A 712.

Referring to the sequence example in FIGS. 14A to 14D, it is assumed that an advertising packet from a peripheral apparatus does not exist. Thus, the scanning results in "no advertising packet".

In S4905, the OTH control unit A 955 in the communication apparatus 901 confirms that execution of a print request service is instructed by an operation performed on the OTH operation input unit 911.

Because the OTH control unit A 955 in the communication apparatus 901 has obtained that the print service availability status is not the error status disabling the print service in S4904, the OTH control unit A 955 in the communication apparatus 901 waits for the next advertising packet including UUID 1.

In S4906, the OTH control unit A 955 in the communication apparatus 901 in response to a GET_ADV_IND command scans an advertising packet by using the OTH wireless communication unit A 912.

Referring to the sequence example in FIGS. 14A to 14D, it is assumed that an advertising packet from a peripheral apparatus does not exist. Thus, the scanning results in "no advertising packet".

SEQ 1403: Because the processing from S4706 to S4708 in the printing apparatus 701 is the same as the processing in SEQ 1401, any repetitive descriptions will be omitted.

In S4907, the OTH control unit A 955 in the communication apparatus 901 in response to a GET_ADV_IND command scans the advertising packet by using the OTH wireless communication unit A 912.

The OTH wireless communication unit A 912 in the communication apparatus 901 returns a result of the scanning as RESPONSE to the OTH control unit A 955.

In S4908, the OTH control unit A 955 in the communication apparatus 901 acquires a value in the advertising packet and confirms that the advertising packet includes UUID 1 from the printing apparatus 701.

In S4909, the communication apparatus 901 confirms that the normalization field intensity of the printing apparatus 701 having transmitted the advertising packet is not equal to or higher than a threshold value based on a numerical value of the transmission power (TxPowerLevel) of the flag (Flag included in the advertising packet.

The communication apparatus 901 does not start the print service if the normalization field intensity is not equal to or higher than the threshold value even when the advertising packet includes UUID 1 for identifying Service 1 (PRINT_OK).

SEQ 1404: The processing from S4709 to S4713 in the printing apparatus 701 is the same as the processing from SEQ 1401 to SEQ 1402, any repetitive descriptions will be omitted.

In S4910, the OTH control unit A 955 in the communication apparatus 901 in response to a GET_ADV_IND command scans the advertising packet by using the OTH wireless communication unit A 912.

The OTH wireless communication unit A 912 in the communication apparatus 901 returns a result of the scanning as RESPONSE to the OTH control unit A 955.

In S4911, the OTH control unit A 955 in the communication apparatus 901 acquires a value in the advertising packet and confirms that the advertising packet includes UUID 1 from the printing apparatus 701.

In S4912, the communication apparatus 901 confirms that the normalization field intensity of the printing apparatus 701 having transmitted the advertising packet is equal to or higher than a threshold value based on a numerical value of the transmission power (TxPowerLevel) of the flag (Flag 6) included in the advertising packet.

The communication apparatus 901 starts the print service if the normalization field intensity is equal to or higher than the threshold value when the advertising packet includes QUID 1 for identifying Service 1 (PRINT_OK).

The communication apparatus 901 establishes a Bluetooth® Low Energy communication link between the OTH wireless communication unit A 912 in the communication apparatus 901 and the PTR wireless communication unit A 712 in the printing apparatus 701.

SEQ 1405: In S4921, the communication apparatus 901 generates a Start WLAN event and turns on the OTH wireless communication unit B 922. The establishment of a WLAN communication link then starts between the PTR wireless communication unit B 722 in the printing apparatus 701 and the OTH wireless communication unit B 922 in the communication apparatus 901.

In S4922, the OTH control unit A 955 in the communication apparatus 901 notifies the start of the WLAN communication link to the OTH wireless communication unit A 912 by using a START_WLAN_HANDOVER command.

In S4721, the PTR wireless communication unit A 712 in the printing apparatus 701 transmits the START_WLAN_HANDOVER command to the PTR control unit A 755.

In S4722, the PTR control unit A 755 generates a Start WLAN event and turns on the PTR wireless communication unit B 722. Then, the WLAN communication link is established between the PTR wireless communication unit B 722 in the printing apparatus 701 and the OTH wireless communication unit B 922 in the communication apparatus 901.

Here, the PTR wireless communication unit B 722 in the printing apparatus 701 and the OTH wireless communication unit B 922 in the communication apparatus 901 can exchange data over the WLAN as a result of the establishment of the WLAN communication link.

The communication apparatus 901 transmits image data to be printed by using the OTH wireless communication unit B 922, and the PTR wireless communication unit B 722 in the printing apparatus 701 receives the image data to be printed.

After the transmission and reception of the image data to be printed are completed, the PTR control unit A 755 in the printing apparatus 701 generates an End WLAN event in S4723. The WLAN communication link between the OTH wireless communication unit B 922 and the PTR wireless communication unit B 722 is cancelled, and the PTR wireless communication unit B 722 is turned off.

In S4724 then, the PTR control unit A 755 transmits a DISCONNECT_WLAN command to the PTR wireless communication unit A 712.

In S4923, the OTH wireless communication unit A 912 in the communication apparatus 901 transmits a DISCONNECT_WLAN command to the OTH control unit A 955.

In S4924, the OTH control unit A 955 in the communication apparatus 901 generates an End WLAN event, and the OTH wireless communication unit B 922 is turned off.

SEQ 1406: In S4931, the OTH wireless communication unit A 912 in the communication apparatus 901 transmits a COMP_IMG_PRINT command indicating that the print service has been completed to the OTH control unit A 955.

The OTH control unit A 955 transmits a TERMINATE_901_LINK command to the OTH wireless communication unit A 912, and the cancelling of the Bluetooth® Low Energy communication link is started between the PTR wireless communication unit A 712 in the printing apparatus 701 and the OTH wireless communication unit A 912 in the communication apparatus 901.

The cancelling of the Bluetooth® Low Energy communication link completes between the PTR wireless communication unit A 712 in the PTR apparatus 701 and the OTH wireless communication unit A 912 in the communication apparatus 901. Then, the PTR wireless communication unit A 712 notifies the cancelling of the Bluetooth® Low Energy communication link to the PTR control unit A 755 by using the DISCONNECT_901 command. The OTH wireless communication unit A 912 notifies the cancelling of the Bluetooth® Low Energy communication link to the OTH control unit A 955 by using a DISCONNECT_701 command.

SEQ 1407: Because the processing from S4731 to S4733 in the printing apparatus 701 and the processing from S4932 to S4935 in the communication apparatus 901 are the same as the processing in SEQ 1401, any repetitive descriptions will be omitted. Because the processing from S4734 to S4735 in the printing apparatus 701 is the same as the processing in the first half of SEQ 1402, any repetitive descriptions will be omitted.

Returning from SEQ 1407 to SEQ 1401, notification of a print service availability status and execution of a print service can be performed again.

The sequence in FIGS. 14A to 14D has been described up to this point.

Referring to the flowcharts and the sequences according to this embodiment, the printing apparatus 701 can notify its print service availability status before the image capture apparatus 801 being a peripheral apparatus or the communication apparatus 901 being a central apparatus instructs execution of a print service.

In a print system in which a print service is automatically triggered by detection of an approach based on a radio wave intensity, the print service availability status can be notified to a user when the user instructs execution of a print service before detection of an approach.

Therefore, when the print service availability status of the printing apparatus 701 is "NO", an error such as "NO INK" and "NO PAPER" of the printing apparatus 701 can be transmitted to avoid any inconvenient situation to a user before the user approaches the printing apparatus 701.

If the print service availability status of the printing apparatus 701 is "YES" and when a user approaches the printing apparatus 701, a print service can be automatically executed so that usability for a user may not be impaired.

Other Embodiments

According to this embodiment, an advertising packet to be transmitted if the print service availability status of the printing apparatus 701 may be "NO" is an advertising packet ADV_IND enabling a connection request (SCAN_REQ), for example. However, an advertising packet to which the present disclosure is applicable is not limited to such an advertising packet enabling a connection request (SCAN_REQ).

For example, the present disclosure is also applicable to a case using an advertising packet ADV_NONCONN_IND disabling a connection request (SCAN_REQ).

According to this embodiment, the PTR wireless communication unit A 712 in the printing apparatus 701, the DSC wireless communication unit A 812 in the image capture apparatus 801, and the PTR wireless communication unit A 912 in the communication apparatus 901 may communicate with each other by using Bluetooth® Low Energy, for example.

However, wireless communication to which the present disclosure is applicable is not limited to Bluetooth® Low Energy that is a short-range wireless communication standard. In other words, the present disclosure is applicable to any kind of wireless communication unit if a peripheral apparatus transmits an advertising packet while a central apparatus executes a connection request to establish a wireless communication is established between the peripheral apparatus and the central apparatus.

According to the present disclosure, the peripheral apparatus can be called a slave apparatus while the central apparatus can be called a master apparatus. In other words, the present disclosure is applicable to any kind of wireless communication unit if a slave apparatus transmits an advertising packet while a master apparatus executes a connection request to establish a wireless communication is established between the slave apparatus and the master apparatus.

The present disclosure can also be realized through execution of the following processing.

That is, software (program) implementing functions of the embodiment is supplied to a system or an apparatus over a network or through a storage medium. A computer (or a CPU or an MPU, for example) in the system or the apparatus reads out and executes the program.

Embodiment(s) can also be realized by a computer of a system or apparatus that reads out and executes computer executable instructions (e.g., one or more programs) recorded on a storage medium which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform die functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-191590 filed Sep. 29, 2016, which is hereby incorporated by reference herein in its entirety.

What is claimed is:

1. A communication apparatus comprising:
   at least one processor; and
   a communication interface,
   wherein the at least one processor functions as:
   a receiving unit configured to receive a signal from an external apparatus via the communication interface;
   a transmitting unit configured to transmit a signal to the external apparatus via the communication interface;
   an executing unit configured to establish a connection with the external apparatus and execute a predetermined function using the established connection; and
   a control unit configured to cause the communication apparatus to operate as a peripheral apparatus or a central apparatus,
   wherein, in a case where an error relating to the predetermined function occurs,
   (1) the control unit causes the communication apparatus to function as the peripheral apparatus, and the transmitting unit transmits a second advertise signal for notifying about the error that has occurred, via the communication interface, to a second external apparatus that operates as the central apparatus, and
   (2) the control unit, after the second advertise signal is transmitted, causes the communication apparatus to operate as the central apparatus instead of the peripheral apparatus, and the transmitting unit transmits a connection request to a first external apparatus that functions as the peripheral apparatus, in response to receipt of a first advertise signal by the receiving unit from the first external apparatus, to establish a connection with the first external apparatus and transmits a notification indicating that the error occurred.

2. The communication apparatus according to claim 1, wherein if it is determined that the receiving unit does not receive a connection request from the second external apparatus in response to the second advertise signal, the transmitting unit transmits the connection request in response to the first advertise signal.

3. The communication apparatus according to claim 1, wherein the executing unit executes the predetermined function in response to a request from the second external apparatus after establishing a connection with the second external apparatus.

4. The communication apparatus according to claim 3, wherein the transmitting unit transmits the second advertise signal before receiving a request from the second external apparatus.

5. The communication apparatus according to claim 1, wherein the second external apparatus is a cellular phone.

6. The communication apparatus according to claim 1, wherein the second external apparatus is a tablet device.

7. The communication apparatus according to claim 1, wherein the executing unit executes the predetermined function in response to a request from the first external apparatus after establishing a connection with the first external apparatus.

8. The communication apparatus according to claim 7, wherein the transmitting unit transmits a notification indicating the error occurred before receiving a request from the first external apparatus.

9. The communication apparatus according to claim 1,
   wherein the communication apparatus is a printing apparatus, and
   wherein the predetermined function is a function for printing content data received from a third external apparatus.

10. The communication apparatus according to claim 9, wherein the cause of the error is due to one or more of paper and ink for printing.

11. The communication apparatus according to claim 1, wherein the first external apparatus is an image capture apparatus.

12. The communication apparatus according to claim 1, wherein the second advertise signal for notifying about the error that has occurred includes information describing a cause of the error.

13. A control method for a communication apparatus, the method comprising:
- receiving a signal from an external apparatus;
- transmitting a signal to the external apparatus;
- establishing a connection with the external apparatus;
- executing a predetermined function using the established connection; and
- in a case where an error relating to the predetermined function occurs,
  - (1) functioning as a peripheral apparatus and transmitting a second advertise signal for notifying about the error that has occurred to a second external apparatus that operates as a central apparatus, and
  - (2) after the second advertise signal has been transmitted, operating as the central apparatus instead of the peripheral apparatus, transmitting a connection request to a first external apparatus that functions as the peripheral apparatus, in response to receipt of a first advertise signal from the first external apparatus, to establish a connection with the first external apparatus, and transmitting a notification indicating that the error occurred.

14. A recording medium storing computer readable instructions to cause a computer to execute a method, the method comprising:
- receiving a signal from an external apparatus;
- transmitting a signal to the external apparatus;
- establishing a connection with the external apparatus;
- executing a predetermined function using the established connection; and
- in a case where an error relating to the predetermined function occurs,
  - (1) functioning as a peripheral apparatus and transmitting a second advertise signal for notifying about the error that has occurred to a second external apparatus that operates as a central apparatus, and
  - (2) after the second advertise signal has been transmitted, operating as the central apparatus instead of the peripheral apparatus, transmitting a connection request to a first external apparatus that functions as the peripheral apparatus, in response to receipt of a first advertise signal from the first external apparatus, to establish a connection with the first external apparatus, and transmitting a notification indicating that the error occurred.

* * * * *